(12) United States Patent
Couch et al.

(10) Patent No.: US 12,528,809 B2
(45) Date of Patent: Jan. 20, 2026

(54) CRYSTALLINE FORMS OF GEPOTIDACIN

(71) Applicant: GLAXOSMITHKLINE INTELLECTUAL PROPERTY DEVELOPMENT LIMITED, Middlesex (GB)

(72) Inventors: Ricky Wayne Couch, Durham, NC (US); Wenning Dai, West Chester, PA (US); Senthil Davison, Raleigh, NC (US); Israil Pendrak, Collegeville, PA (US); Glenn Robert Williams, Pearland, TX (US)

(73) Assignee: GlaxoSmithKline Intellectual Property Development Limited, Stevenage (GB)

(*) Notice: Subject to any disclaimer, the term of this patent is extended or adjusted under 35 U.S.C. 154(b) by 595 days.

(21) Appl. No.: 17/997,293

(22) PCT Filed: Apr. 27, 2021

(86) PCT No.: PCT/EP2021/060983
§ 371 (c)(1),
(2) Date: Oct. 27, 2022

(87) PCT Pub. No.: WO2021/219637
PCT Pub. Date: Nov. 4, 2021

(65) Prior Publication Data
US 2023/0167113 A1  Jun. 1, 2023

Related U.S. Application Data

(60) Provisional application No. 63/017,167, filed on Apr. 29, 2020.

(51) Int. Cl.
*C07D 471/16* (2006.01)
*A61K 31/4985* (2006.01)
*A61P 31/00* (2006.01)

(52) U.S. Cl.
CPC ........ *C07D 471/16* (2013.01); *C07B 2200/13* (2013.01)

(58) Field of Classification Search
None
See application file for complete search history.

(56) References Cited

U.S. PATENT DOCUMENTS

2010/0137282 A1* 6/2010 Davies .................... A61P 31/04
514/224.2

FOREIGN PATENT DOCUMENTS

WO  WO-2008128942 A1 * 10/2008 ............. A61P 31/00
WO  2016027249 A1  2/2016

OTHER PUBLICATIONS

Topics in Current Chemistry, 1998, vol. 198, pp. 163-208 (Year: 1998).*
Gepotidacin mesylate (USAN) (PubChem SID 328082971); Feb. 25, 2015; USAN File No. cd-66; UNII: 5P7X0H2O2R; https://searchusan.ama-assn.org/finder/usan/search/GEPOTIDACIN%20MESYLATE/relevant/1/.
Gepotidacin mesylate (PubChem SID 328082971); 2017; https://pubchem.ncbi.nlm.nih.gov/substance/328082971#section=2D-Structure.
Gepotidacin mesylate dihydrate (PubChem SID 385740800), 2019; https://pubchem.ncbi.nlm.nih.gov/substance/385740800#section=2D-Structure.
So W, Crandon JL, Nicolau DP. 2015. Pharmacodynamic profile of GSK2140944 against methicillin-resistant *Staphylococcus aureus* in a murine lung infection model. Antimicrob Agents Chemother 59:4956-4961.
Kaul, G., et al., Broad-spectrum DNA topoisomerase II inhibitor Treatment of bacterial infections, Drugs of the Future 2018, 43(11): 797-808, DOI: 10.1358/dof.2018.043.11.2869759.
Negash, et al., The metabolism and disposition of GSK2140944 in healthy human subjects. Xenobiotica, 46:, 683-702, 2016.
Elizabeth G. Gibson et al: "Mechanistic and Structural Basis for the Actions of the Antibacterial Gepotidacin against *Staphylococcus aureus* Gyrase", ACS Infectious Diseases, vol. 5, No. 4, (Feb. 13, 2019), pp. 570-581, XP055715965, US.
Minor Caira Ed—Montchamp Jean-Luc: "Crystalline Polymorphism of Organic Compounds", Topics in Current Chemistry; Springer, Berlin, DE, vol. 198, (Jan. 1, 1998), pp. 163-208, XP001156954.

* cited by examiner

*Primary Examiner* — Brian Gulledge
(74) *Attorney, Agent, or Firm* — Hao Yin

(57) ABSTRACT

Disclosed are novel crystalline forms of gepotidacin and pharmaceutical compositions containing the same. Also disclosed are processes for the preparation thereof and methods for use thereof.

24 Claims, 24 Drawing Sheets

CRYSTALLINE FORMS OF GEPOTIDACIN

STATEMENT REGARDING FEDERALLY SPONSORED RESEARCH

This invention was made with the US government support under Agreement No.: HDTRA1-07-9-0002 awarded by the Defense Threat Reduction Agency. The US government may have certain rights in the invention.

BACKGROUND OF THE INVENTION (2R)-2-({4-[(3,4-Dihydro-2H-pyrano[2,3-c]pyridin-6-yl-methyl)amino]-1-piperidinyl}methyl)-1,2-dihydro-3H,8H-2a,5,8a-triazaacenaphthylene-3,8-dione (hereinafter "gepotidacin") selectively inhibits bacterial DNA gyrase and topoisomerase IV by a unique mechanism, which is not utilized by any currently approved human therapeutic agent.

International Patent Application Publication No. WO 2008/128942 describes a series of compounds which can be used as antibacterial agents, including gepotidacin. Mono-HCl salt of gepotidacin was prepared in Example 39 of WO 2008/128942, which is incorporated herein by reference in its entirety.

SUMMARY OF THE INVENTION

The present application relates to novel crystalline forms of gepotidacin. Gepotidacin has the structure of Formula (I).

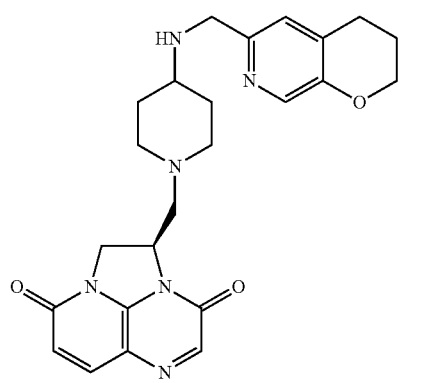

(I)

The present disclosure provides a crystalline form of gepotidacin, such as gepotidacin mesylate anhydrate, gepotidacin mesylate monohydrate, gepotidacin mesylate dihydrate, gepotidacin anhydrate, or a combination thereof. The present disclosure also provides methods for making the crystalline forms of gepotidacin, pharmaceutical composition comprising the crystalline form of gepotidacin, and methods of treating bacterial infections using the crystalline form of gepotidacin.

DETAILED DESCRIPTION OF THE INVENTION

The present application is directed to novel crystalline forms of gepotidacin. Gepotidacin mesylate demonstrated a strong propensity to form various hydrates and solvates and most were found to be unstable. In addition to the gepotidacin mesylate dihydrate form, six additional hydrates were characterized. Four non-solvated forms and multiple solvates were identified. At least thirty nine forms of gepotidacin mesylate have been observed in total, including solvates (dimethyl formamide, trifluoroethanol, chlorobenzene, nitromethane) and solvates/hydrates (acetonitrile, dichloromethane, chloroform, dioxane, 1-butanol, isopropyl alcohol).

Crystalline gepotidacin mesylate dihydrate (Form 1) was the predominant form observed from screening indicating that it is the most thermodynamically stable form at or around room temperature.

Gepotidacin Mesylate Dihydrate (Form 1)

In some embodiments, the crystalline form of gepotidacin is gepotidacin mesylate dihydrate. Gepotidacin mesylate dihydrate can be represented by the structure below.

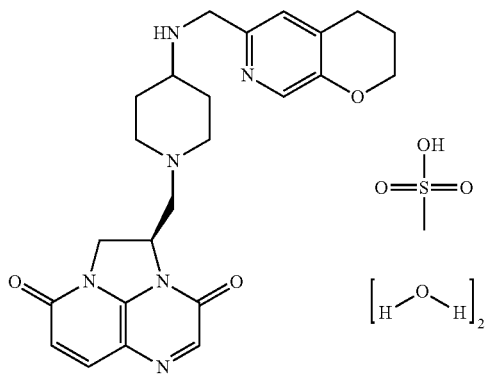

In one embodiment, gepotidacin mesylate dihydrate is characterized by an X-ray powder diffraction (XRPD) pattern comprising at least three, at least four, at least five, at least six, at least seven, at least eight, or at least nine diffraction angles, when measured using Cu $K_\alpha$ radiation, selected from the group consisting of about 9.0, 11.5, 13.4, 14.3, 14.9, 15.5, 17.6, 18.6, and 20.7 degrees 2θ. As used herein, when the term "about" is before a list of numbers, the term applies to each of the listed numbers. In one embodiment, gepotidacin mesylate dihydrate is characterized by an XRPD pattern comprising at least three diffraction angles, when measured using Cu $K_\alpha$ radiation, selected from the group consisting of about 13.4, 15.5, 17.6, and 18.6 degrees 2θ. In one embodiment, gepotidacin mesylate dihydrate is characterized by an XRPD pattern comprising four diffraction angles, when measured using Cu $K_\alpha$ radiation, at about 13.4, 15.5, 17.6, and 18.6 degrees 2θ. In one embodiment, gepotidacin mesylate dihydrate is characterized by an XRPD pattern comprising three diffraction angles, when measured using Cu $K_\alpha$ radiation, at about 13.4, 17.6, and 18.6 degrees 2θ.

Figure 1:
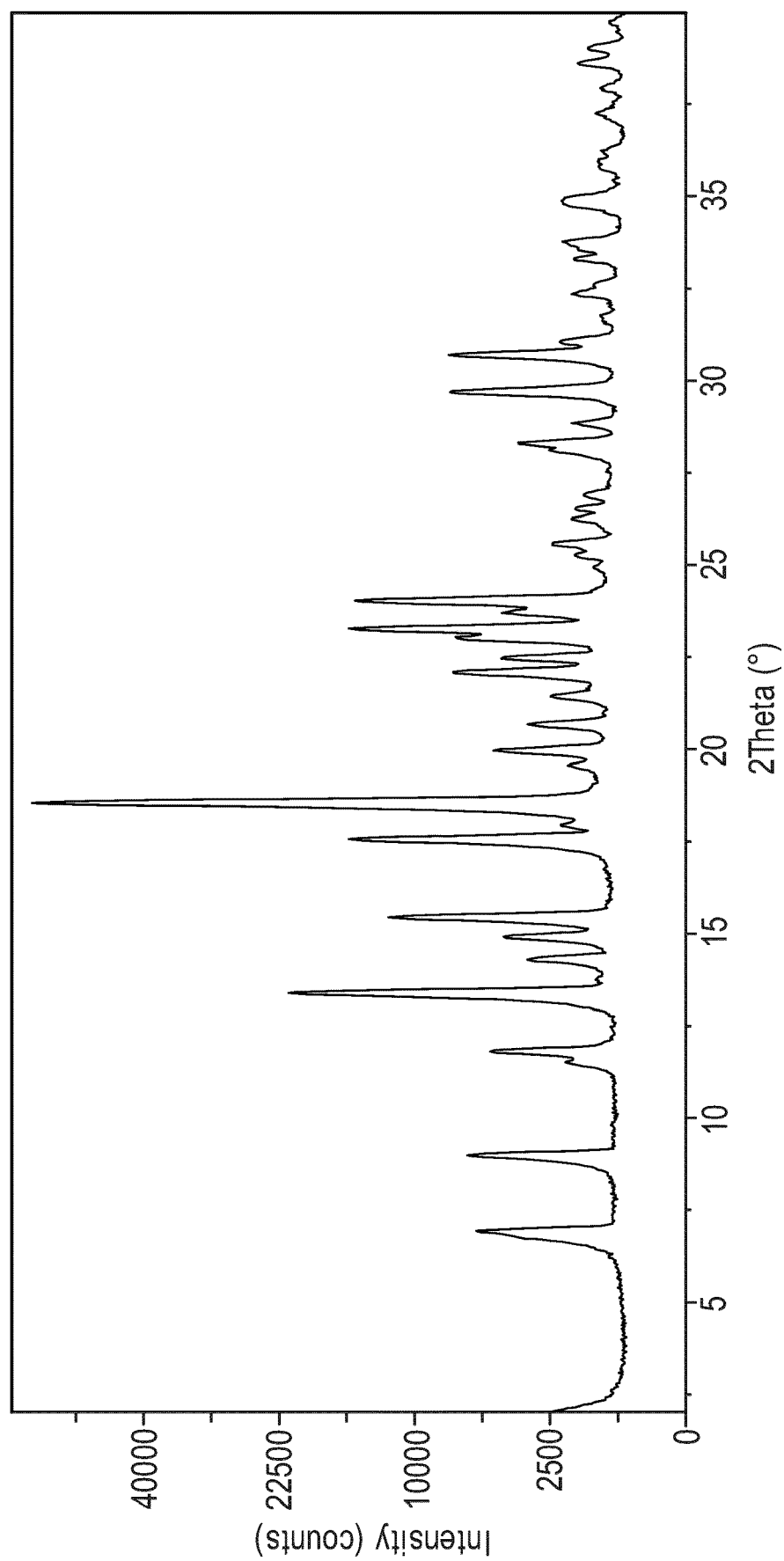
FIG. 1 shows an X-ray powder diffraction pattern of gepotidacin mesylate dihydrate (Form 1).

In one embodiment, gepotidacin mesylate dihydrate is characterized by an XRPD pattern substantially in accordance with FIG. 1. In one embodiment, gepotidacin mesylate dihydrate is characterized by an XRPD pattern substantially in accordance with FIG. 20.

In one embodiment, gepotidacin mesylate dihydrate is characterized by a Raman spectrum comprising at least three, at least four, at least five, at least six, or at least seven peaks at positions selected from the group consisting of peaks at about 1154, 1269, 1306, 1518, 1584, 1637 and 1676 $cm^{-1}$. In one embodiment, gepotidacin mesylate dihydrate is characterized by a Raman spectrum substantially in accordance with FIG. 2.

Figure 3:
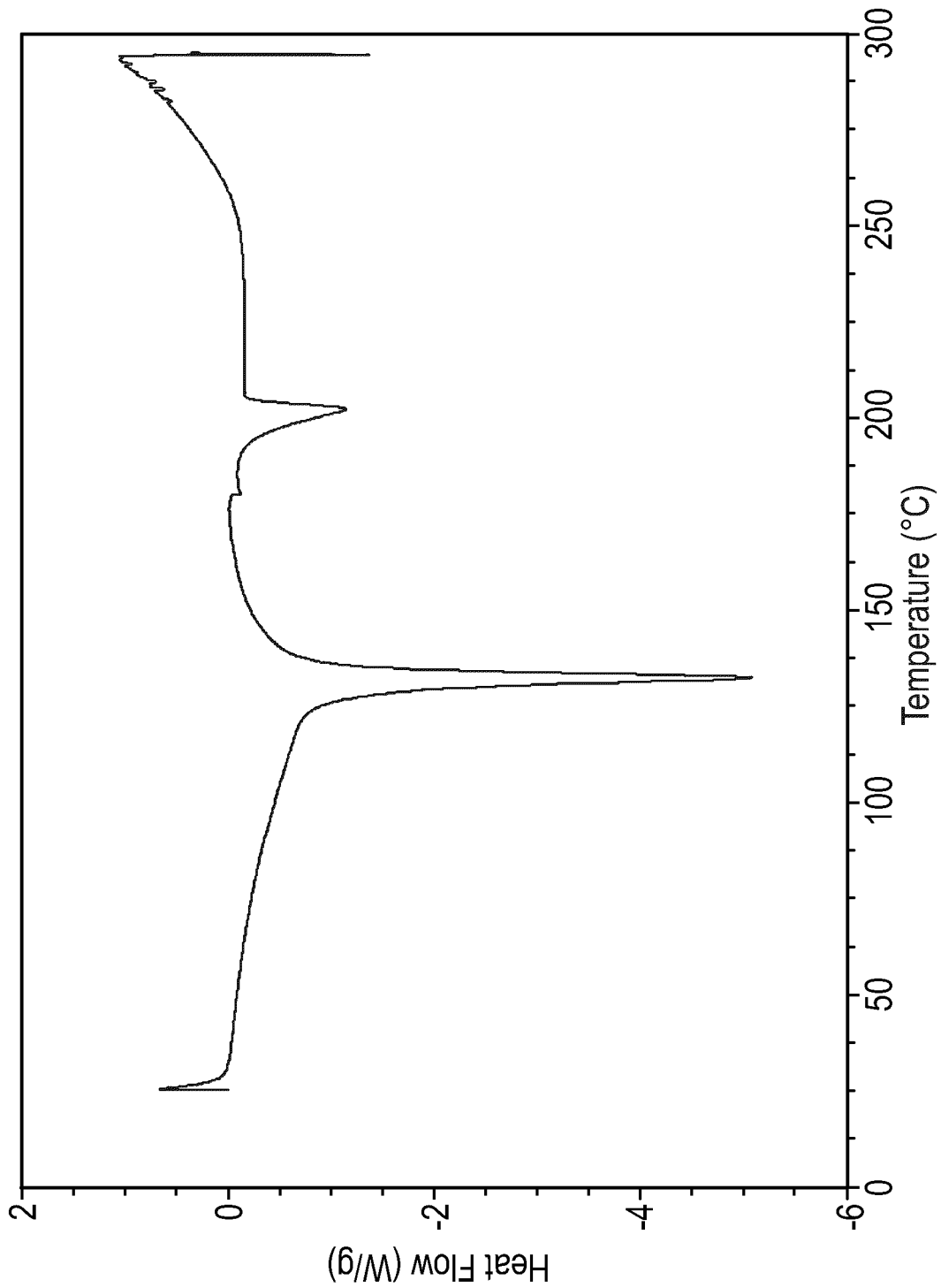
FIG. 3 shows a differential scanning calorimetry trace of gepotidacin mesylate dihydrate (Form 1).
Figure 4:
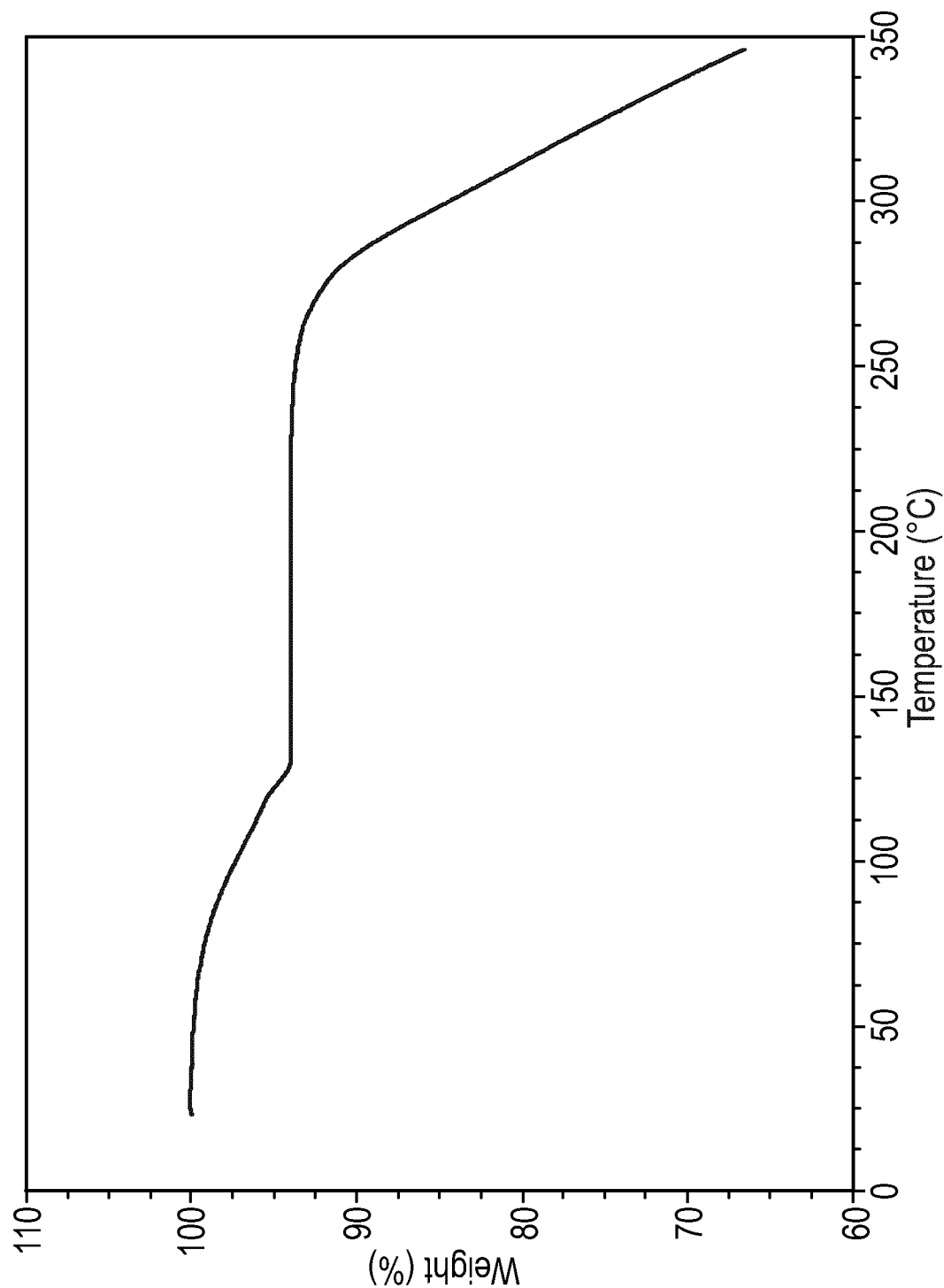
FIG. 4 shows a thermogravimetric analysis trace of gepotidacin mesylate dihydrate (Form 1).

In further embodiments, gepotidacin mesylate dihydrate is characterized by a differential scanning calorimetry trace substantially in accordance with FIG. 3 and/or a thermogravimetric analysis trace substantially in accordance with FIG. 4.

In another embodiment, gepotidacin mesylate dihydrate is characterized by single crystal XRD resulting in the following unit cell parameters:
α=6.9255(5)Å; b=15.4500(12)Å; c=25.7918(19)Å;
α=β=γ=90°;
V=2759.7(4)Å³; Z'=1;
Space group $P2_12_12_1$;
Molecules/unit cell 4;
Density (calculated) 1.398 g/cm³;
wherein Z' is the number of molecules per asymmetric unit.

The present application also provides a method for preparing gepotidacin mesylate dihydrate comprising crystallizing gepotidacin mesylate in a solvent mixture of water and an organic solvent. In one embodiment, the organic solvent is acetone. In one embodiment, the organic solvent is an alcohol. In one embodiment, the organic solvent is $C_{1-3}$ alkanol. In one embodiment, the organic solvent is 2-propanol (i.e., isopropanol).

In one embodiment, the present application provides a method of preparing gepotidacin mesylate dihydrate comprising crystallizing gepotidacin mesylate in 2-propanol containing about 5% v/v water (e.g., a mixture of 5 mL water and 95 mL 2-propanol) or about 5.5% v/v water (e.g., a mixture of 5.5 mL water and 94.5 mL 2-propanol). In some embodiments, the method of preparing gepotidacin mesylate dihydrate is carried out on a commercial scale (e.g., greater than 1 kg, 5 kg, or 10 kg).

Gepotidacin Mesylate Anhydrate (Form 2)

In some embodiments, the crystalline form of gepotidacin is gepotidacin mesylate anhydrate. In one embodiment, gepotidacin mesylate anhydrate is characterized by an XRPD pattern comprising at least three, at least four, at least five, at least six, or at least seven diffraction angles, when measured using Cu $K_\alpha$ radiation, selected from the group consisting of about 7.1, 9.7, 12.1, 14.2, 15.2, 17.3, and 20.2. In one embodiment, gepotidacin mesylate anhydrate is characterized by an XRPD pattern comprising at least three diffraction angles, when measured using Cu $K_\alpha$ radiation, selected from the group consisting of about 7.1, 9.7, 15.2, and 17.3. In one embodiment, gepotidacin mesylate anhydrate is characterized by an XRPD pattern comprising four diffraction angles, when measured using Cu $K_\alpha$ radiation, at about 7.1, 9.7, 15.2, and 17.3. In one embodiment, gepotidacin mesylate anhydrate is characterized by an XRPD pattern comprising three diffraction angles, when measured using Cu $K_\alpha$ radiation, at about 9.7, 15.2, and 17.3.

Figure 5:
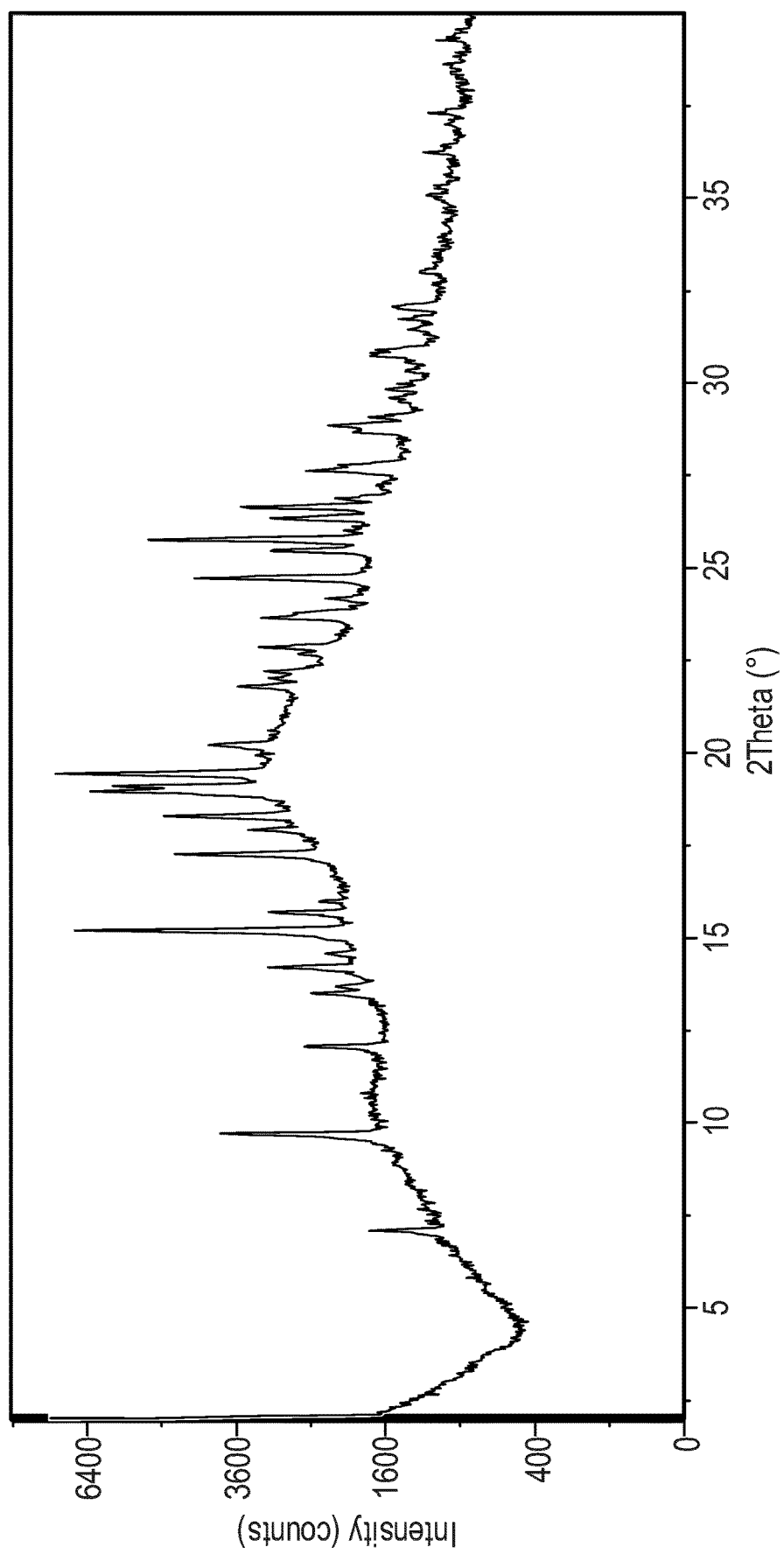
FIG. 5 shows an X-ray powder diffraction pattern of gepotidacin mesylate anhydrate (Form 2).

In one embodiment, gepotidacin mesylate anhydrate is characterized by an XRPD pattern substantially in accordance with FIG. 5. In one embodiment, gepotidacin mesylate anhydrate is characterized by an XRPD pattern substantially in accordance with FIG. 21.

In one embodiment, gepotidacin mesylate anhydrate is characterized by a Raman spectrum comprising at least three, at least four, at least five, or at least six peaks at positions selected from the group consisting of peaks at about 1105, 1260, 1280, 1297, 1517, and 1642 $cm^{-1}$. In one embodiment, gepotidacin mesylate anhydrate is characterized by a Raman spectrum substantially in accordance with FIG. 6.

Figure 7:
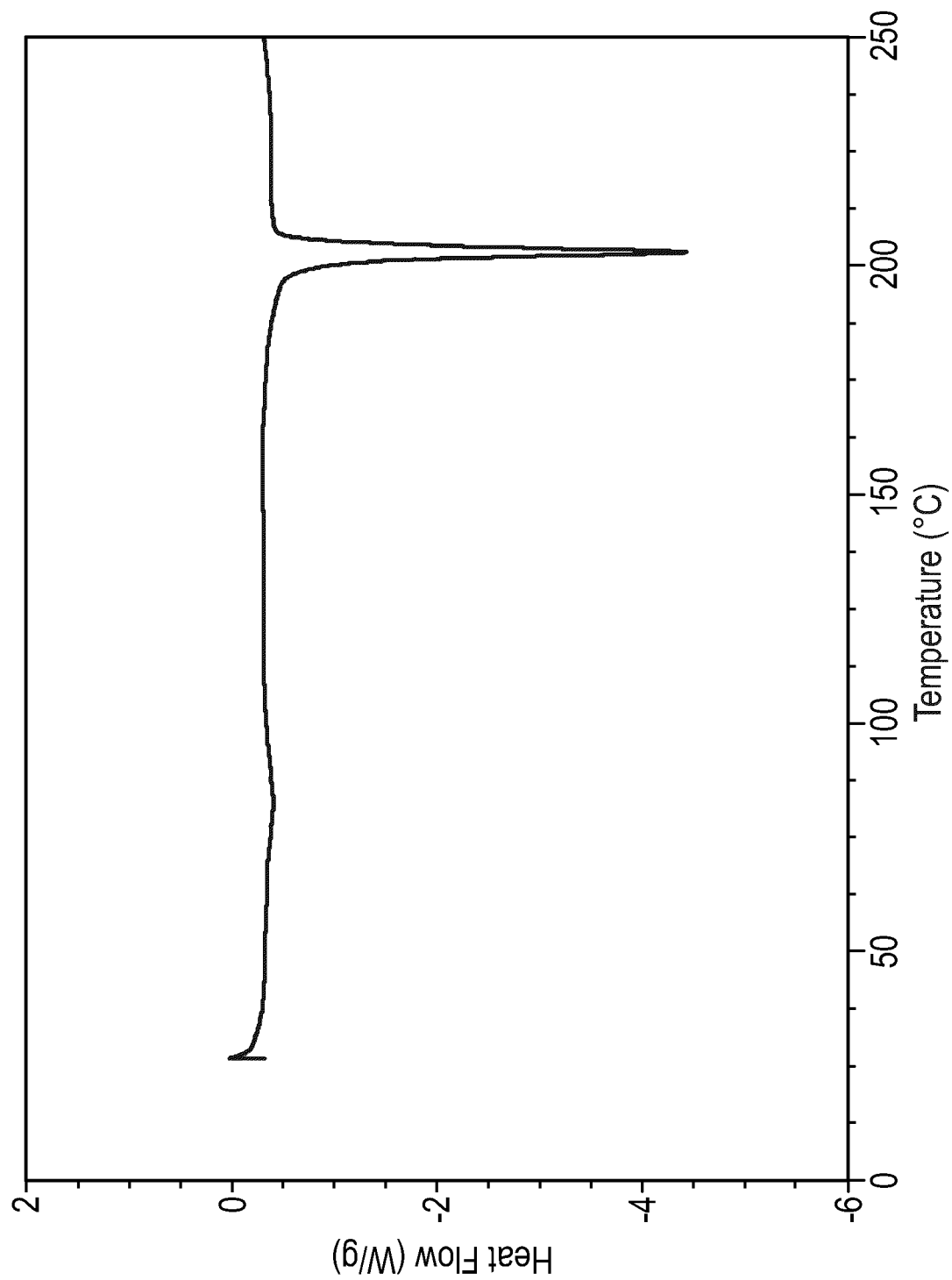
FIG. 7 shows a differential scanning calorimetry trace of gepotidacin mesylate anhydrate (Form 2).
Figure 8:
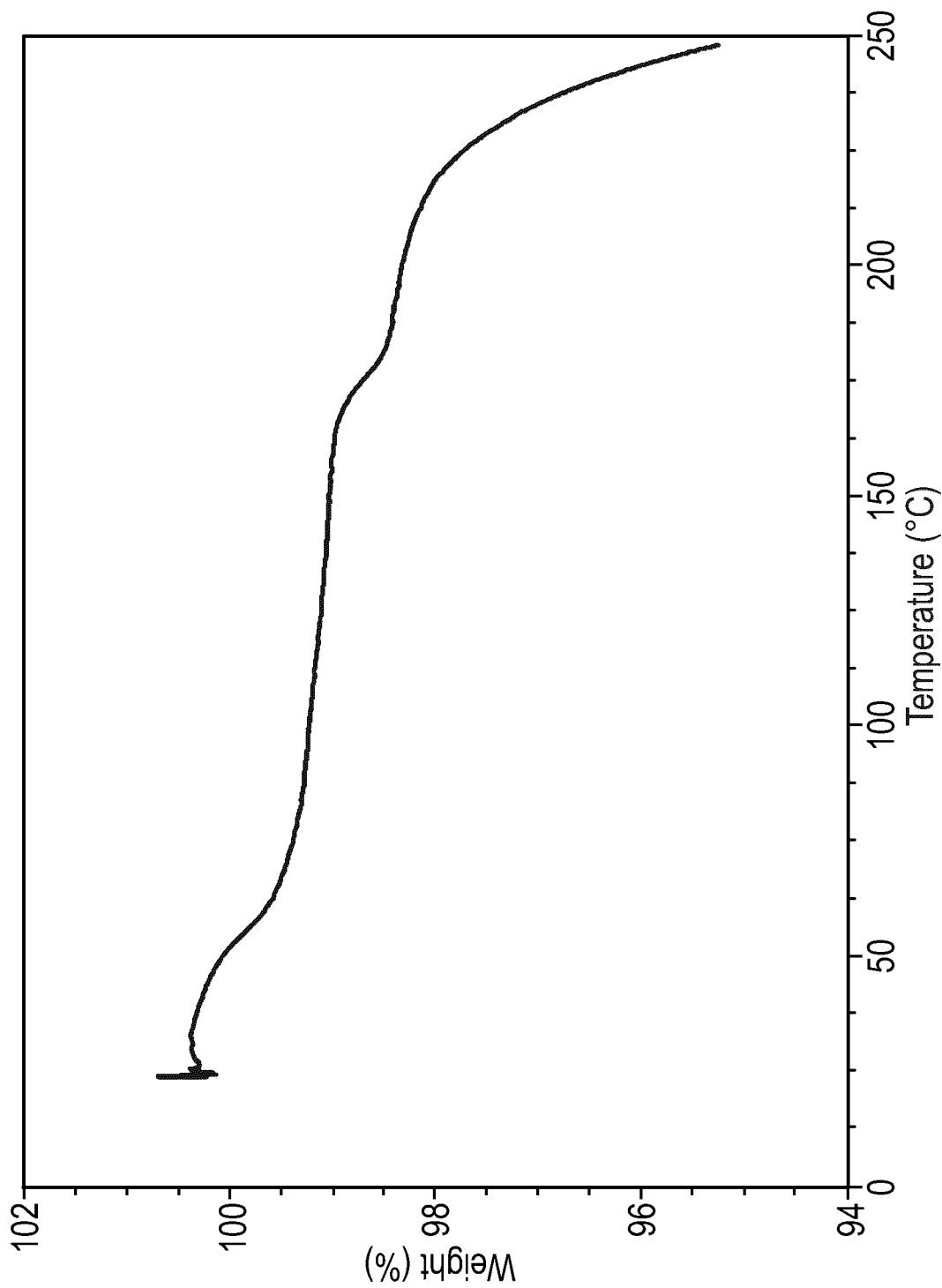
FIG. 8 shows a thermogravimetric analysis trace of gepotidacin mesylate anhydrate (Form 2).

In further embodiments, gepotidacin mesylate anhydrate is characterized by a differential scanning calorimetry trace substantially in accordance with FIG. 7 and/or a thermogravimetric analysis trace substantially in accordance with FIG. 8.

In another embodiment, gepotidacin mesylate anhydrate is characterized by single crystal XRD resulting in the following unit cell parameters:
α=12.3921(7)Å; b=7.0262(4)Å; c=14.6536(9)Å;
α=γ=90°;
β=95.0077(13°); V=1271.01(13)Å³; Z'=1;
Space group $P2_1$;
Molecules/unit cell 2;

Density (calculated) 1.423 g/cm$^3$;
wherein Z' is the number of molecules per asymmetric unit.

Gepotidacin Mesylate Monohydrate (Form 3)

In some embodiments, the crystalline form of gepotidacin is gepotidacin mesylate monohydrate. In one embodiment, gepotidacin mesylate monohydrate is characterized by an XRPD pattern comprising at least three, at least four, at least five, at least six, at least seven, at least eight, or at least nine diffraction angles, when measured using Cu K$_\alpha$ radiation, selected from the group consisting of about 5.6, 7.1, 8.8, 11.2, 13.0, 13.7, 20.1, 21.6, and 23.3. In one embodiment, gepotidacin mesylate monohydrate is characterized by an XRPD pattern comprising at least three diffraction angles, when measured using Cu K$_\alpha$ radiation, selected from the group consisting of about 8.8, 11.2, 20.1, and 23.3. In one embodiment, gepotidacin mesylate monohydrate is characterized by an XRPD pattern comprising four diffraction angles, when measured using Cu K$_\alpha$ radiation, at about 8.8, 11.2, 20.1, and 23.3. In one embodiment, gepotidacin mesylate monohydrate is characterized by an XRPD pattern comprising three diffraction angles, when measured using Cu K$_\alpha$ radiation, at about 8.8, 11.2, and 20.1.

Figure 9:
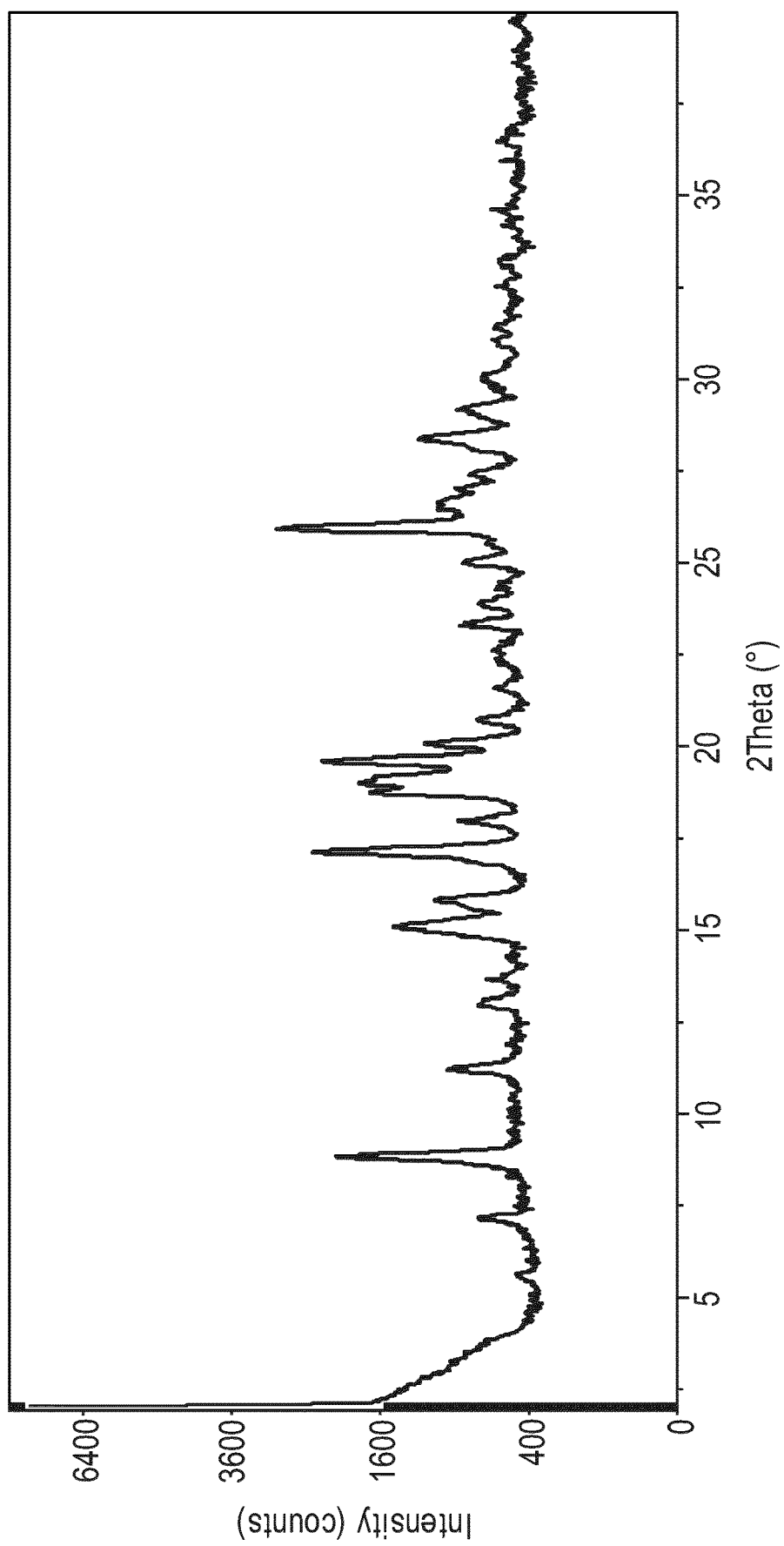
FIG. 9 shows an X-ray powder diffraction pattern of gepotidacin mesylate monohydrate (Form 3).

In one embodiment, crystalline gepotidacin mesylate monohydrate is characterized by an XRPD pattern substantially in accordance with FIG. 9. In one embodiment, crystalline gepotidacin mesylate monohydrate is characterized by an XRPD pattern substantially in accordance with FIG. 22.

In one embodiment, gepotidacin mesylate monohydrate is characterized by a Raman spectrum comprising at least three, at least four, or at least five peaks at positions selected from the group consisting of peaks at about 1148, 1272, 1292, 1516, and 1649 cm$^1$. In one embodiment, gepotidacin mesylate monohydrate is characterized by a Raman spectrum substantially in accordance with FIG. 10.

Figure 11:
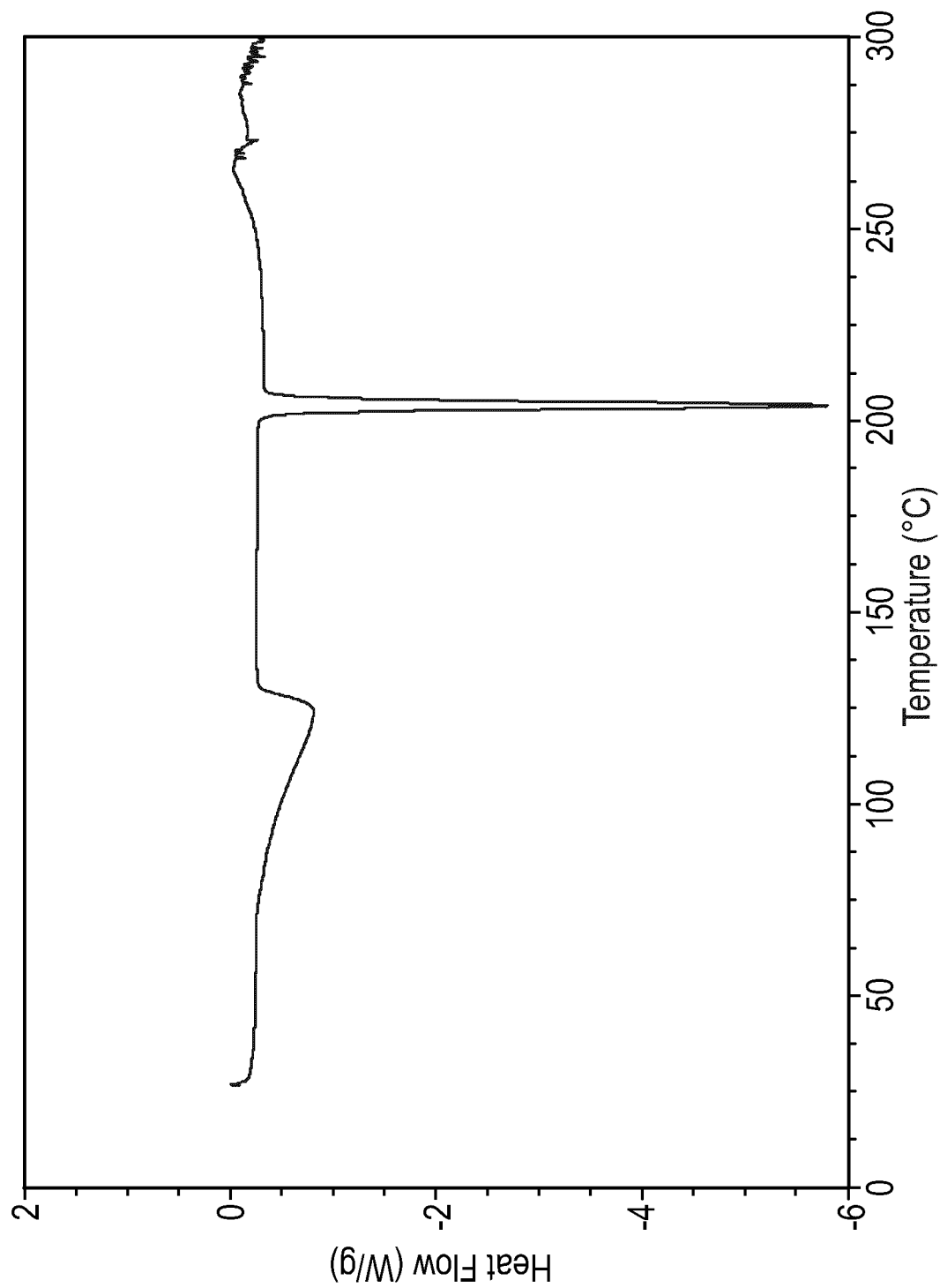
FIG. 11 shows a differential scanning calorimetry trace of gepotidacin mesylate monohydrate (Form 3).
Figure 12:
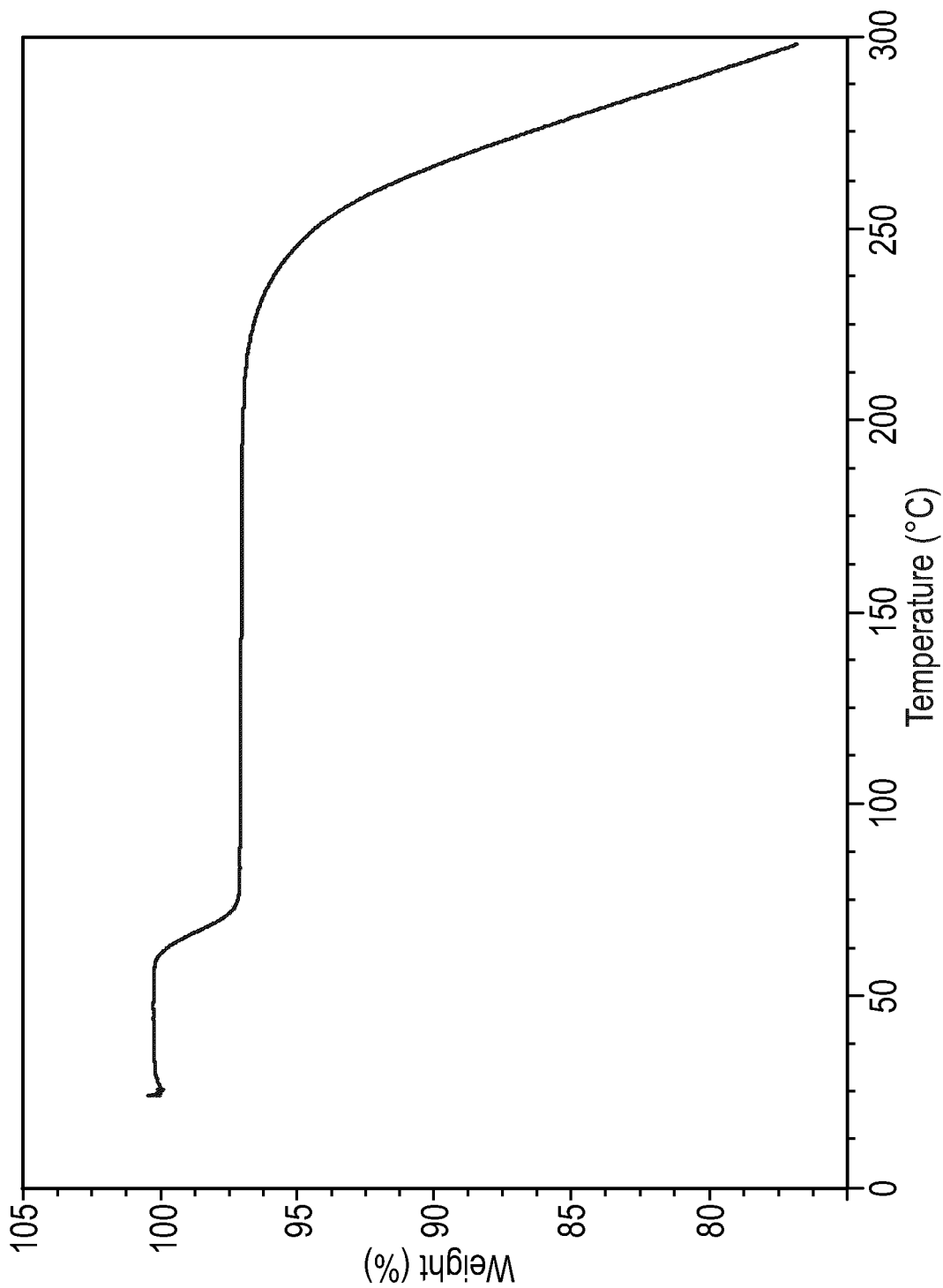
FIG. 12 shows a thermogravimetric analysis trace of gepotidacin mesylate monohydrate (Form 3).

In further embodiments, gepotidacin mesylate monohydrate is characterized by a differential scanning calorimetry trace substantially in accordance with FIG. 11 and/or a thermogravimetric analysis trace substantially in accordance with FIG. 12.

Gepotidacin Anhydrate

In some embodiments, the crystalline form of gepotidacin is gepotidacin anhydrate (i.e., free base). In one embodiment, gepotidacin anhydrate is characterized by an XRPD pattern comprising at least three, at least four, at least five, at least six, at least seven, at least eight, or at least nine diffraction angles, when measured using Cu K$_\alpha$ radiation, selected from the group consisting of about 8.8, 10.8, 11.7, 12.8, 13.2, 14.4, 16.3, 19.9, 20.8, and 25.0. In one embodiment, gepotidacin anhydrate is characterized by an XRPD pattern comprising at least three diffraction angles, when measured using Cu K$_\alpha$ radiation, selected from the group consisting of about 8.8, 13.2, 14.4, and 20.8. In one embodiment, gepotidacin anhydrate is characterized by an XRPD pattern comprising four diffraction angles, when measured using Cu K$_\alpha$ radiation, at about 8.8, 13.2, 14.4, and 20.8. In one embodiment, gepotidacin anhydrate is characterized by an XRPD pattern comprising three diffraction angles, when measured using Cu K$_\alpha$ radiation, at about 8.8, 13.2, and 14.4.

Figure 13:
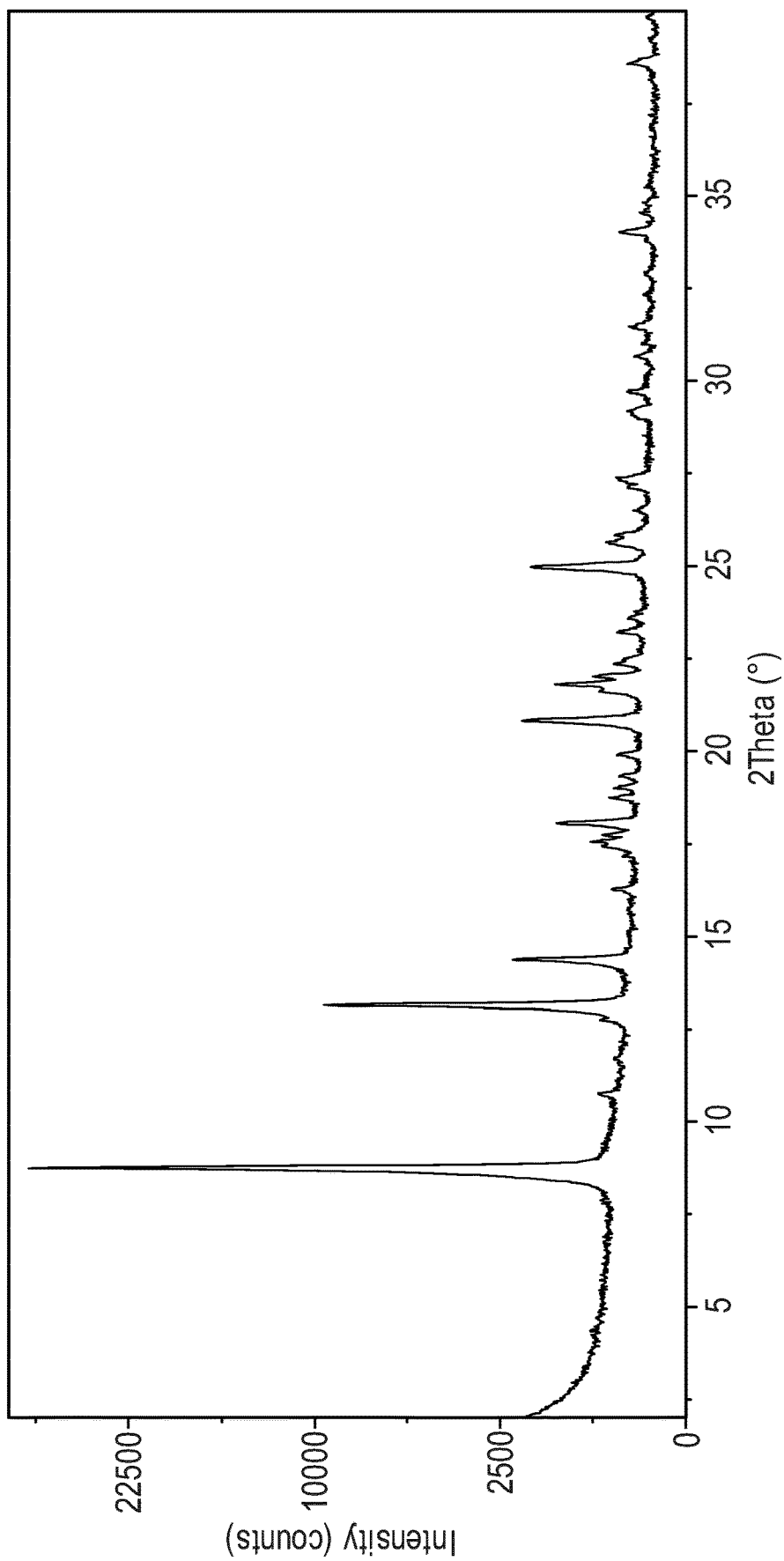
FIG. 13 shows an X-ray powder diffraction pattern of gepotidacin anhydrate.

In one embodiment, gepotidacin anhydrate is characterized by an XRPD pattern substantially in accordance with FIG. 13. In one embodiment, gepotidacin anhydrate is characterized by an XRPD pattern substantially in accordance with FIG. 23.

In one embodiment, gepotidacin anhydrate is characterized by a Raman spectrum comprising at least three, at least four, at least five, at least six, at least seven, or at least eight peaks at positions selected from the group consisting of peaks at about 1099, 1143, 1289, 1344, 1476, 1516, 1612, and 1687 cm$^{-1}$. In one embodiment, gepotidacin anhydrate is characterized by a Raman spectrum substantially in accordance with FIG. 14.

Figure 15:
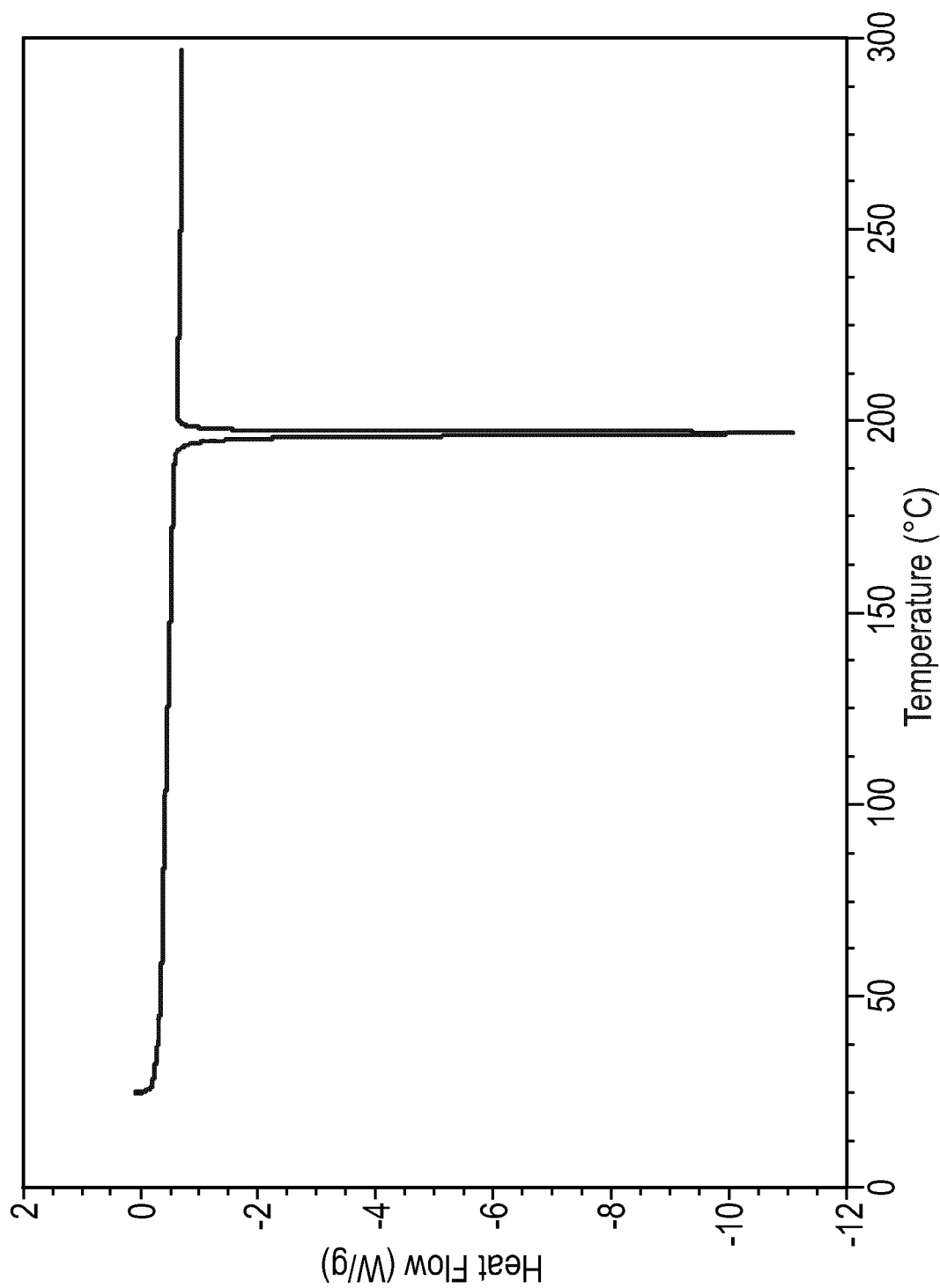
FIG. 15 shows a differential scanning calorimetry trace of gepotidacin anhydrate.
Figure 16:
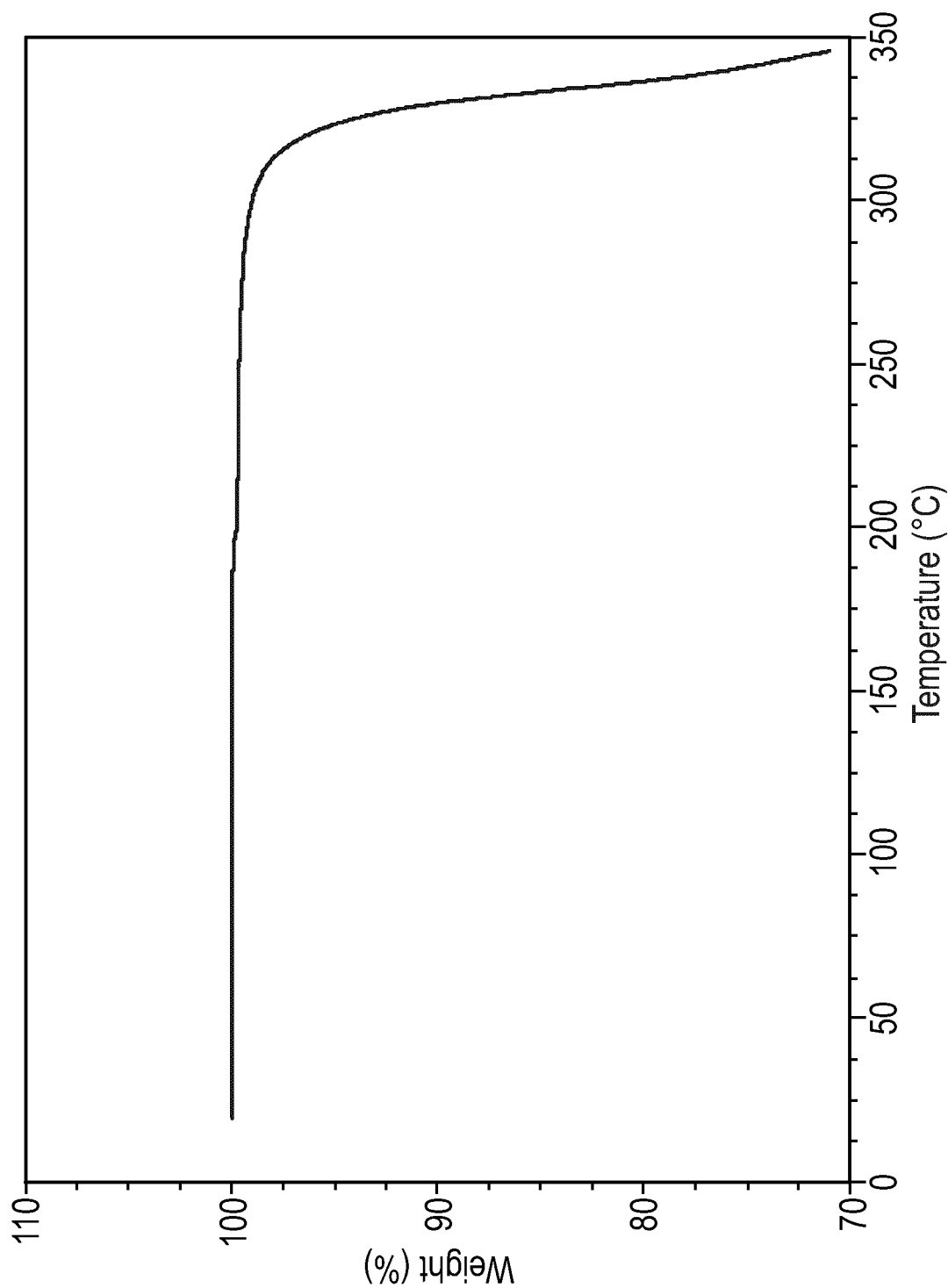
FIG. 16 shows a thermogravimetric analysis trace of gepotidacin anhydrate.

In further embodiments, gepotidacin anhydrate is characterized by a differential scanning calorimetry trace substantially in accordance with FIG. 15 and/or a thermogravimetric analysis trace substantially in accordance with FIG. 16.

In another embodiment, gepotidacin anhydrate is characterized by single crystal XRD resulting in the following unit cell parameters: a=8.44022(16)Å; b=6.42442(12)Å; c=20.2774(5)Å; α=γ=90°; β=96.778(2°); V=1091.83(4)Å$^3$; Z'=1;

Space group P2$_1$;
Drug molecules/unit cell 2;
Density (calculated) 1.364 g/cm$^3$;
wherein Z' is the number of drug molecules per asymmetric unit.

In still further embodiments, as a person having ordinary skill in the art will understand, a particular gepotidacin polymorph is characterized by any combination of two or more sets of the analytical data characterizing the aforementioned embodiments. For example, in one embodiment, gepotidacin mesylate dihydrate is characterized by an X-ray powder diffraction (XRPD) pattern substantially in accordance with FIG. 1 or FIG. 20, a Raman spectrum substantially in accordance with FIG. 2, a differential scanning calorimetry trace substantially in accordance with FIG. 3, and a thermogravimetric analysis trace substantially in accordance with FIG. 4.

Figure 2:
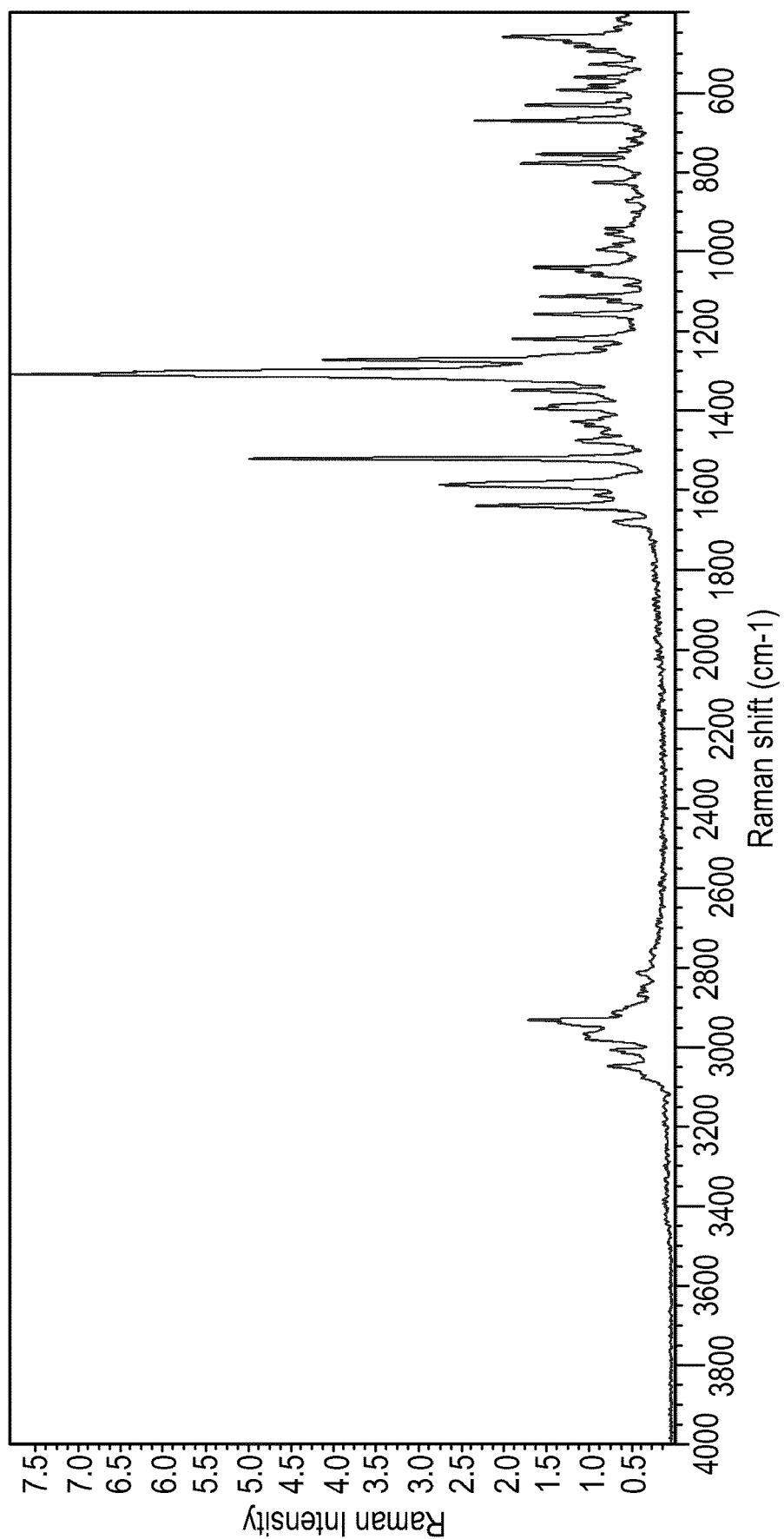
FIG. 2 shows a Raman spectrum of gepotidacin mesylate dihydrate (Form 1).

In another embodiment, gepotidacin mesylate dihydrate is characterized by an X-ray powder diffraction (XRPD) pattern substantially in accordance with FIG. 1 and a Raman spectrum substantially in accordance with FIG. 2. In another embodiment, gepotidacin mesylate dihydrate is characterized by an X-ray powder diffraction (XRPD) pattern substantially in accordance with FIG. 1 and a differential scanning calorimetry trace substantially in accordance with FIG. 3. In another embodiment, gepotidacin mesylate dihydrate is characterized by an X-ray powder diffraction (XRPD) pattern substantially in accordance with FIG. 1 and a thermogravimetric analysis trace substantially in accordance with FIG. 4.

In one embodiment, the present application provides a crystalline form of gepotidacin as disclosed herein, which has a polymorphic purity of at least 80%, at least 85%, at least 90%, or at least 95%. In one embodiment, the present application provides gepotidacin mesylate dihydrate having a polymorphic purity of at least 80%, at least 85%, at least 90%, or at least 95%. In another embodiment, the present application provides gepotidacin anhydrate having a polymorphic purity of at least 80%, at least 85%, at least 90%, or at least 95%. As used herein, the term "polymorphic purity" refers to the weight percentage of a specific form in a sample containing that form and other form(s) of gepotidacin. Polymorphic purity can be measured by methods known in the art, e.g., by XRPD.

An XRPD pattern will be understood to comprise a diffraction angle (expressed in degrees 2θ) of "about" a value specified herein when the XRPD pattern comprises a diffraction angle within ±0.2 degrees 2θ of the specified value. Further, it is well known and understood to those skilled in the art that the apparatus employed, humidity, temperature, orientation of the powder crystals, and other parameters involved in obtaining an X-ray powder diffraction (XRPD) pattern may cause some variability in the appearance, intensities, and positions of the lines in the diffraction pattern. The term "XRPD" is used herein exchangeably with the term "PXRD."

An X-ray powder diffraction pattern that is "substantially in accordance" with that of FIG. 1, 5, 9, 13, 20, 21, 22, or 23 provided herein is an XRPD pattern that would be considered by one skilled in the art to represent a compound possessing the same crystal form as the compound that provided the XRPD pattern of FIG. 1, 5, 9, 13, 20, 21, 22, or 23. That is, the XRPD pattern may be identical to that of FIG. 1, 5, 9, 13, 20, 21, 22, or 23, or more likely it may be somewhat different. Such an XRPD pattern may not necessarily show each of the lines of any one of the diffraction patterns presented herein, and/or may show a slight change in appearance, intensity, or a shift in position of said lines resulting from differences in the conditions involved in obtaining the data. A person skilled in the art is capable of determining if a sample of a crystalline compound has the same form as, or a different form from, a form disclosed herein by comparison of their XRPD patterns. For example, one skilled in the art can overlay an XRPD pattern of a sample containing gepotidacin, with FIG. 1 and, using expertise and knowledge in the art, readily determine whether the XRPD pattern of the sample is substantially in accordance with the XRPD pattern of gepotidacin mesylate dihydrate (Form 1). If the XRPD pattern is substantially in accordance with FIG. 1, the sample form can be readily and accurately identified as having the same form as Form 1.

A Raman spectrum will be understood to comprise a peak (expressed in cm$^{-1}$) of "about" a value specified herein when the Raman spectrum comprises a peak within ±5.0 cm$^{-1}$ of the specified value. Further, it is also well known and understood to those skilled in the art that the apparatus employed, humidity, temperature, orientation of the powder crystals as a solid or in a suspension, and other parameters involved in obtaining a Raman spectrum may cause some variability in the appearance, intensities, and positions of the peaks in the spectrum. A Raman spectrum that is "substantially in accordance" with that of FIG. 2, 6, 10, or 14 provided herein is a Raman spectrum that would be considered by one skilled in the art to represent a compound possessing the same crystal form as the compound that provided the Raman spectrum of FIG. 2, 6, 10, or 14. That is, the Raman spectrum may be identical to that of FIG. 2, 6, 10, or 14, or more likely it may be somewhat different. Such a Raman spectrum may not necessarily show each of the peaks of any one of the spectra presented herein, and/or may show a slight change in appearance, intensity, or a shift in position of said peaks resulting from differences in the conditions involved in obtaining the data. A person skilled in the art is capable of determining if a sample of a crystalline compound has the same form as, or a different form from, a form disclosed herein by comparison of their Raman spectra. For example, one skilled in the art can overlay a Raman spectrum of a sample of gepotidacin mesylate, with FIG. 2 and, using expertise and knowledge in the art, readily determine whether the Raman spectrum of the sample is substantially in accordance with the Raman spectrum of gepotidacin mesylate dihydrate (Form 1). If the Raman spectrum is substantially in accordance with FIG. 2, the sample form can be readily and accurately identified as having the same form as Form 1.

"Compound of the invention" means (2R)-2-({4-[(3,4-dihydro-2H-pyrano[2,3-c]pyridin-6-ylmethyl)amino]-1-piperidinyl}methyl)-1,2-dihydro-3H,8H-2a,5,8a-triazaacenaphthylene-3,8-dione (i.e., gepotidacin), and its novel crystalline forms, including gepotidacin mesylate anhydrate, gepotidacin mesylate monohydrate, gepotidacin mesylate dihydrate, gepotidacin anhydrate, and a combination thereof.

Use, Method of Treatment, and Pharmaceutical Compositions

The invention includes a method for treating bacterial infections in a human in need thereof comprising administering to the human an effective amount of a compound of the invention or a composition comprising an effective amount of a compound of the invention and an optional pharmaceutically acceptable carrier. The bacterial infections can be caused by a wide range of organisms including both Gram-negative and Gram-positive organisms, and the infection include, but not limited to, upper and/or lower respiratory tract infections, skin and soft tissue infections, urinary tract infections, and gonorrhea. In some embodiments, the infection is urinary tract infection. In some embodiments, the infections is gonorrhoea. The method of treating bacterial infections by using gepotidacin is disclosed in WO2008/128942 and WO2016/027249, both of which are incorporated herein by reference in their entirety.

In some embodiments, the infection is urinary tract infection caused by *Escherichia coli* (*E. coli*), *Staphylococcus saprophyticus*, *Citrobacter koseri*, or *Klebsiella pneumoniae* (*K. pneumoniae*). In some embodiments, the infection is urinary tract infection caused by *E. coli*.

In another embodiment, the infection is gonorrhoea caused by *Neisseria gonorrhoeae*.

As used herein, the term "treatment" refers to alleviating the specified condition, eliminating or reducing one or more symptoms of the condition, slowing or eliminating the progression of the condition, and preventing or delaying the reoccurrence of the condition in a previously afflicted or diagnosed patient or subject.

As used herein, the term "effective amount" means that amount of a drug or pharmaceutical agent that will elicit the biological or medical response of a tissue, system, animal, or human that is being sought, for instance, by a researcher or clinician. Unless otherwise stated, the amount of a drug or pharmaceutical agent refers to the amount of the free base compound, not the amount of the corresponding pharmaceutically acceptable salt.

The present invention is also directed to a pharmaceutical composition comprising a compound of the invention and a pharmaceutically acceptable carrier. The present invention is further directed to a method of preparing a pharmaceutical composition comprising admixing a compound of the invention and a pharmaceutically acceptable carrier.

"Pharmaceutically acceptable carrier" means any one or more compounds and/or compositions that are of sufficient purity and quality for use in the formulation of the compound of the invention that, when appropriately administered to a human, do not produce an adverse reaction, and that are used as a vehicle for a drug substance (i.e. a compound of the present invention). Carriers may include excipients, diluents, granulating and/or dispersing agents, surface active agents and/or emulsifiers, binding agents, preservatives, buffering agents, lubricating agents, and natural oils.

The invention further includes the process for making a pharmaceutical composition comprising mixing a compound of the invention and one or more pharmaceutically acceptable carriers; and includes those compositions resulting from such a process, which process includes conventional pharmaceutical techniques. For example, a compound of the invention may be nanomilled prior to formulation. A compound of the invention may also be prepared by grinding, micronizing or other particle size reduction methods known in the art. The pharmaceutical compositions of the invention may be prepared using techniques and methods known to those skilled in the art. Some of the methods commonly used in the art are described in Remington's Pharmaceutical Sciences (Mack Publishing Company), the entire teachings of which are incorporated herein by reference.

In particular, the compound of the present invention, or corresponding pharmaceutical compositions or formulations used in the present invention may be formulated for administration in any convenient way for use in human or veterinary medicine, by analogy with other antibacterials/antitubercular compounds.

The pharmaceutical compositions used in the present invention may be formulated for administration by any route and include those in a form adapted for oral, topical or parenteral use and may be used in mammals including humans.

The compositions may be in the form of tablets, capsules, powders, granules, lozenges, suppositories, creams or liquid preparations, such as oral or sterile parenteral solutions or suspensions.

In one embodiment, the compound of the present invention is in a tablet or a capsule form. In one embodiment, it is in a tablet form. In one embodiment, the tablet is a 750 mg tablet.

The formulations may also contain compatible conventional carriers, such as cream or ointment bases and ethanol or oleyl alcohol for lotions. Such carriers may be present as from about 1% up to about 98% of the formulation. More usually they will form up to about 80% of the formulation.

Tablets and capsules for oral administration in the present invention may be in unit dose presentation form, and may contain conventional excipients such as binding agents, for example syrup, acacia, gelatin, sorbitol, tragacanth, or polyvinylpyrrolidone; fillers, for example lactose, sugar, maize-starch, calcium phosphate, sorbitol or glycine; tabletting lubricants, for example magnesium stearate, talc, polyethylene glycol or silica; disintegrants, for example potato starch; or acceptable wetting agents such as sodium lauryl sulphate. The tablets may be coated according to methods well known in normal pharmaceutical practice. Oral liquid preparations may be in the form of, for example, aqueous or oily suspensions, solutions, emulsions, syrups or elixirs, or may be presented as a dry product for reconstitution with water or other suitable vehicle before use. Such liquid preparations may contain conventional additives, such as suspending agents, for example sorbitol, methyl cellulose, glucose syrup, gelatin, hydroxyethyl cellulose, carboxymethyl cellulose, aluminium stearate gel or hydrogenated edible fats, emulsifying agents, for example lecithin, sorbitan monooleate, or acacia; non-aqueous vehicles (which may include edible oils), for example almond oil, oily esters such as glycerine, propylene glycol, or ethyl alcohol; preservatives, for example methyl or propyl p-hydroxybenzoate or sorbic acid, and, if desired, conventional flavouring or colouring agents.

Suppositories will contain conventional suppository bases, e.g. cocoa-butter or other glyceride.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilised before filling into a suitable vial or ampoule and sealing.

Advantageously, agents such as a local anaesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection may be supplied to reconstitute the liquid prior to use. Parenteral suspensions are prepared in substantially the same manner except that the compound is suspended in the vehicle instead of being dissolved and sterilization cannot be accomplished by filtration. The compound can be sterilised by exposure to ethylene oxide before suspending in the sterile vehicle. Advantageously, a surfactant or wetting agent is included in the composition to facilitate uniform distribution of the compound.

Moreover, the quantity of the compound or pharmaceutical composition used in the present invention will vary depending on the patient and the mode of administration and can be any effective amount.

The compositions may contain from 0.1% by weight, preferably from 10-60% by weight, of the active material, depending on the method of administration. Where the compositions comprise dosage units, each unit will preferably contain from 50-1000 mg of the active ingredient.

The dosage as employed for adult human treatment in the present invention will preferably range from 100 to 6000 mg per day, for instance 1500 mg per day depending on the route and frequency of administration. Such a dosage corresponds to about 1.5 to about 80 mg/kg per day. Suitably the dosage is from 5 to 80 mg/kg per day. In one embodiment, the dosage is 1500 mg twice a day (i.e. 3000 mg per day). In one embodiment, the dosage is 3000 mg twice a day (i.e. 6000 mg per day). In one embodiment, the two doses in one day are given 6-12 hours apart.

Thus in one embodiment, the present invention provides a method for treating urinary tract infection (UTI), comprising administering gepotidacin or a pharmaceutically acceptable salt thereof, in a therapeutically effective amount in a human subject in need thereof, wherein the gepotidacin or a pharmaceutically acceptable salt thereof is administered at 1500 mg twice a day, 6-12 hours apart.

In particular, a composition of the present invention is presented as a unit dose and taken preferably from 1 to 5 times daily, such as once or twice daily to achieve the desired effect. In one embodiment, gepotidacin or its pharmaceutically acceptable salt thereof is administered for any of 3, 4, 5, 6 or 7 continuous days. In one embodiment, in any aspect of the present invention, gepotidacin or its pharmaceutically acceptable salt thereof is administered for 5 continuous days.

In another embodiment, the present invention provides a method for treating infection by *Neisseria gonorrhoeae*, comprising administering gepotidacin or a pharmaceutically acceptable salt thereof, in a therapeutically effective amount in a human subject in need thereof, wherein the gepotidacin or a pharmaceutically acceptable salt thereof is administered twice, each at 3000 mg, 6-12 hours apart. In another embodiment, the present invention provides a method for treating infection by *Neisseria gonorrhoeae*, comprising administering gepotidacin or a pharmaceutically acceptable salt thereof, in a therapeutically effective amount in a human subject in need thereof, wherein the gepotidacin or a pharmaceutically acceptable salt thereof is administered twice, each at 3000 mg, 10-12 hours apart.

Conventional administration methods may be suitable for use in the present invention.

Depending upon the treatment being effected, the compounds, and/or or compositions of the present invention can be administered orally, intravascularly, intraperitoneally, subcutaneously, intramuscularly or topically. Preferably, the composition is adapted for oral administration.

Gepotidacin or a pharmaceutically acceptable salt used in the present invention may be the sole therapeutic agent in the compositions of the invention or a combination with other antibacterials. If the other antibacterial is a β-lactam then a β-lactamase inhibitor may also be employed.

In certain embodiments, this invention relates to a pharmaceutical composition comprising gepotidacin mesylate anhydrate, gepotidacin mesylate monohydrate, gepotidacin mesylate dihydrate, gepotidacin anhydrate, or a combination thereof. In another embodiment, this invention relates to a pharmaceutical composition comprising gepotidacin wherein at least 10% by weight of gepotidacin is present as gepotidacin mesylate dihydrate. In another embodiment, this invention relates to a pharmaceutical composition comprising gepotidacin wherein at least 20% by weight, or at least 30% by weight, or at least 40% by weight, or at least 50% by weight, or at least 60% by weight, or at least 70% by weight, or at least 80% by weight, or at least 90% by weight of gepotidacin is present as gepotidacin mesylate dihydrate. In another embodiment, this invention relates to a pharmaceutical composition comprising gepotidacin wherein at least 95% by weight, or at least 96% by weight, or at least 97% by weight, or at least 98% by weight, or at least 99% by weight of gepotidacin is present as gepotidacin mesylate dihydrate.

In another embodiment, this invention relates to a pharmaceutical composition comprising gepotidacin wherein at least 10% by weight of gepotidacin is present as gepotidacin anhydrate. In another embodiment, this invention relates to a pharmaceutical composition comprising gepotidacin wherein at least 20% by weight, or at least 30% by weight, or at least 40% by weight, or at least 50% by weight, or at least 60% by weight, or at least 70% by weight, or at least 80% by weight, or at least 90% by weight of gepotidacin is present as gepotidacin anhydrate. In another embodiment, this invention relates to a pharmaceutical composition comprising gepotidacin wherein at least 95% by weight, or at least 96% by weight, or at least 97% by weight, or at least 98% by weight, or at least 99% by weight of gepotidacin is present as gepotidacin anhydrate.

In another embodiment, this invention relates to a pharmaceutical composition comprising a mixture selected from the group consisting of gepotidacin mesylate anhydrate, gepotidacin mesylate monohydrate, gepotidacin mesylate dihydrate, and gepotidacin anhydrate. In one embodiment, the pharmaceutical composition comprises a mixture of gepotidacin mesylate dihydrate, gepotidacin mesylate anhydrate, and gepotidacin mesylate monohydrate. In one embodiment, the pharmaceutical composition comprises a mixture of gepotidacin mesylate dihydrate and gepotidacin mesylate anhydrate. In one embodiment, the pharmaceutical composition comprises a mixture of gepotidacin mesylate dihydrate and gepotidacin anhydrate.

In some embodiments, this present application relates to a pharmaceutical composition comprising gepotidacin mesylate dihydrate substantially free of gepotidacin mesylate anhydrate. In some embodiments, the present application relates to a pharmaceutical composition comprising gepotidacin mesylate dihydrate substantially free of gepotidacin mesylate anhydrate and gepotidacin mesylate monohydrate. As used herein, the term "substantially free" means less than about 10% by weight, less than about 5% by weight, less than about 4% by weight, less than about 3% by weight, less than about 2% by weight, or less than about 1% by weight, as compared to the total weight of the gepotidacin forms.

The Examples set forth below are illustrative of the present invention and are not intended to limit, in any way, the scope of the present invention.

EXPERIMENTALS

The following examples illustrate the invention. These examples are not intended to limit the scope of the present invention, but rather to provide guidance to the skilled artisan to prepare and use the compounds, compositions, and methods of the present invention. While particular embodiments of the present invention are described, the skilled artisan will appreciate that various changes and modifications can be made without departing from the spirit and scope of the invention. Unless otherwise noted, reagents are commercially available or are prepared according to procedures in the literature.

Example 1

Gepotidacin Mesylate Dihydrate (Form 1)

Example 1a—Preparation Method 1

Acetone (5 ml) was added to gepotidacin (294.14 mg). To the slurry, methanesulfonic acid (3M solution in water, 1 equivalent) was added over a period of 60 minutes. The slurry was heated to 50° C. for 3 hours, cooled slowly to 20° C., left stirring at 20° C. for 5 hours and cooled further to 5° C. The slurry was stirred at 5° C. overnight. The crystalline solids were filtered under vacuum, washed with acetone and dried in a vacuum oven at 60° C. to give crystalline gepotidacin mesylate dihydrate (Form 1) in 72.9% yield.

Example 1b—Preparation Method 2

Gepotidacin (32.00 kg) and methanesulfonic acid (7.00 kg, 1.02 eq) were heated to 74-80° C. in 304 L of 2-propanol and 16.1 kg water. The solution was filtered into a crystallisation vessel and cooled to 59-63° C. Form 1 dihydrate (0.318 kg) suspended in 5% v/v aqueous 2-propanol (1.194 kg 2-propanol and 0.080 L water) was added and the mixture aged at 58-64° C. for 2 hours. The mixture was cooled to 15-25° C. and the resulting slurry was wet-milled. The slurry was heated to 55-61° C. and cooled to 15-25° C. Gepotidacin mesylate dihydrate was isolated by filtration, washed twice with 5% v/v aqueous 2-propanol (2×106 L 2-propanol and 2×5.6 kg water), and dried under vacuum at about 40° C. to give gepotidacin mesylate dihydrate (Form 1) (38.505 kg) as a crystalline solid.

Example 1c—XRPD

The X-ray powder diffraction (XRPD) pattern of gepotidacin mesylate dihydrate (Form 1) is shown in FIG. 1 and a summary of the diffraction angle and d-spacings is given in table 1 below. The XRPD analysis was conducted on a PANalytical X'Pert Pro diffractometer on Si zero-background wafers. The acquisition conditions included Cu K$_\alpha$ radiation, generator tension 45 kV, generator current: 40 mA, step size 0.03° 2θ.

TABLE 1

| Diff Angle [°2θ] | d-spacing [Å] |
|---|---|
| 6.9 | 12.7 |
| 9.0 | 9.8 |
| 11.5 | 7.7 |
| 11.8 | 7.5 |
| 13.4 | 6.6 |
| 14.3 | 6.2 |
| 14.9 | 5.9 |
| 15.5 | 5.7 |
| 17.6 | 5.0 |
| 17.9 | 4.9 |
| 18.6 | 4.8 |
| 19.6 | 4.5 |
| 20.0 | 4.4 |
| 20.7 | 4.3 |
| 21.4 | 4.1 |
| 22.1 | 4.0 |
| 22.5 | 4.0 |
| 23.0 | 3.9 |
| 23.3 | 3.8 |
| 23.7 | 3.8 |
| 24.0 | 3.7 |
| 24.9 | 3.6 |
| 25.3 | 3.5 |
| 25.6 | 3.5 |
| 26.2 | 3.4 |
| 26.5 | 3.4 |
| 26.9 | 3.3 |
| 28.1 | 3.2 |
| 28.3 | 3.2 |
| 28.8 | 3.1 |
| 29.7 | 3.0 |
| 30.7 | 2.9 |
| 31.1 | 2.9 |
| 31.7 | 2.8 |
| 32.3 | 2.8 |
| 32.6 | 2.7 |
| 33.3 | 2.7 |
| 33.8 | 2.7 |
| 34.7 | 2.6 |
| 35.0 | 2.6 |
| 35.8 | 2.5 |
| 36.2 | 2.5 |
| 37.3 | 2.4 |
| 37.9 | 2.4 |
| 38.6 | 2.3 |
| 39.0 | 2.3 |
| 39.7 | 2.3 |

Figure 20:
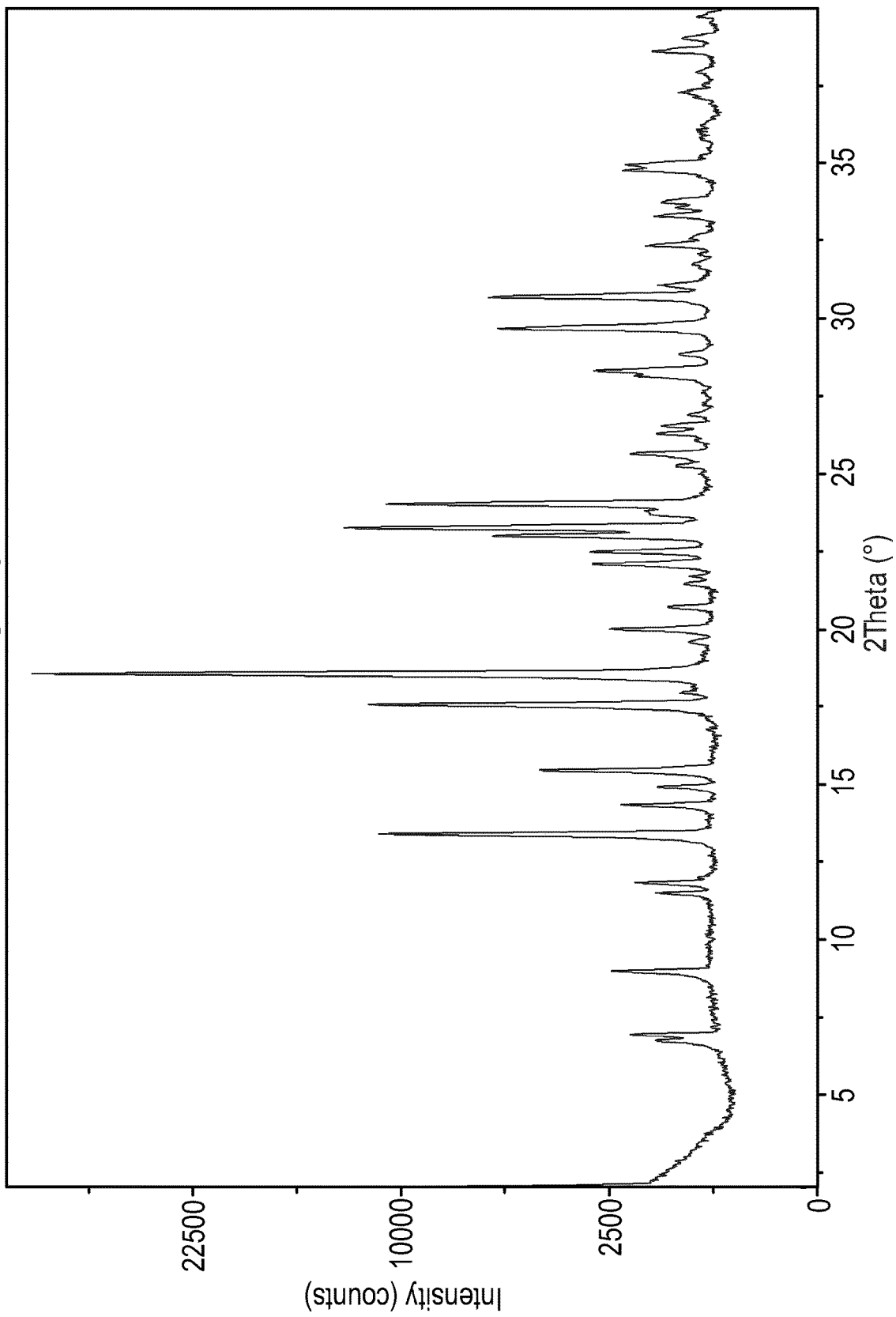
FIG. 20 shows an X-ray powder diffraction pattern of gepotidacin mesylate dihydrate (Form 1).

The XRPD patterns of another sample of gepotidacin mesylate dihydrate (Form 1) is shown in FIG. 20 (see Table 2). The XRPD analysis was conducted on a PANalytical Empyrean diffractometer on Si zero-background wafers. The acquisition conditions included Cu $K_\alpha$ radiation, generator tension 45 kV, generator current: 40 mA, step size 0.03° 2θ.

TABLE 2

| Diff Angle (2θ°) | d-spacing [Å] |
|---|---|
| 6.7 | 13.2 |
| 6.9 | 12.8 |
| 9.0 | 9.9 |
| 11.5 | 7.7 |
| 11.8 | 7.5 |
| 13.4 | 6.6 |
| 14.3 | 6.2 |
| 14.9 | 5.9 |
| 15.4 | 5.7 |
| 17.5 | 5.1 |
| 17.9 | 5.0 |
| 18.5 | 4.8 |
| 19.6 | 4.5 |
| 20.0 | 4.4 |
| 20.7 | 4.3 |
| 21.4 | 4.1 |
| 21.7 | 4.1 |
| 22.1 | 4.0 |
| 22.5 | 4.0 |
| 23.0 | 3.9 |
| 23.2 | 3.8 |
| 23.7 | 3.8 |
| 24.0 | 3.7 |
| 25.2 | 3.5 |
| 25.6 | 3.5 |
| 26.3 | 3.4 |
| 26.5 | 3.4 |
| 26.9 | 3.3 |
| 28.1 | 3.2 |
| 28.3 | 3.2 |
| 28.8 | 3.1 |
| 29.7 | 3.0 |
| 30.7 | 2.9 |
| 31.0 | 2.9 |
| 31.7 | 2.8 |
| 32.3 | 2.8 |
| 33.3 | 2.7 |
| 33.5 | 2.7 |
| 33.7 | 2.7 |
| 34.7 | 2.6 |
| 34.9 | 2.6 |
| 35.9 | 2.5 |
| 37.3 | 2.4 |
| 37.9 | 2.4 |
| 38.6 | 2.3 |
| 39.0 | 2.3 |
| 39.7 | 2.3 |

Example 1d—Raman Spectrum

The Raman spectrum of gepotidacin mesylate dihydrate (Form 1) was recorded on a Nicolet NXR9650 or Thermo Electron NXR 960 spectrometer, at 4 cm$^{-1}$ resolution with excitation from a Nd:YVO4 laser (λ=1064 nm). The Raman spectrum of gepotidacin mesylate dihydrate (Form 1) is shown in FIG. 2 with major peaks observed at 455, 492, 558, 525, 590, 628, 667, 752, 775, 823, 940, 993, 1037, 1109, 1154, 1216, 1269, 1306, 1346, 1392, 1424, 1472, 1518, 1584, 1637, 1676, 2929, 3005 and 3046 cm$^{-1}$.

Example 1e—DSC

The DSC of gepotidacin mesylate dihydrate (Form 1) was conducted with a TA Instruments Q2000 differential scanning calorimeter equipped with an autosampler and a refrigerated cooling system under 40 mL/min N$_2$ purge. DSC thermograms of the sample were obtained at 15° C./min in crimped Al pan. The DSC thermogram of Form 1 exhibits a broad endotherm followed by a sharp endotherm with an onset temperature of about 129° C., followed by an endotherm with an onset temperature of about 195° C. (FIG. 3). A person skilled in the art would recognize that the onset temperature of the endotherm may vary depending on the experimental conditions.

Example 1f—TGA

The thermogravimetric analysis (TGA) thermogram of gepotidacin mesylate dihydrate (Form 1) was recorded on a TA Instruments Q50 thermogravimetric analyzer under 60 mL/min N$_2$ flow and a heating rate of 10° C./min. The TGA thermogram of gepotidacin mesylate dihydrate (Form 1) exhibits a loss of about 6% (2.0 eq) from 30-130° C. (FIG. 4).

Example 1g—Single Crystal Structure

A single crystal of gepotidacin mesylate dihydrate was prepared by slow cooling from a solution of gepotidacin mesylate in water/2-propanol.

Single crystal data were collected on a Bruker D8 Venture system using an Incoatec microfocus 3.0 CuKα Source. Data collection and unit cell Indexing were performed in the APEX3 v2017.3-0 suite (Bruker AXS Inc., 2017); processing of the measured intensity data was carried out with the SAINT V8.38A software package (Bruker AXS Inc., 2017). The structures were solved by direct methods using the SHELXT-2018/2 software package (Sheldrick, 2018). The derived atomic parameters (coordinates and temperature factors) were refined through full matrix least-squares in SHELXL-2018/3 (Sheldrick, 2018). Hydrogens were introduced in idealized positions, except for those on heteroatoms, which were freely refined.

Single crystal X-ray data were measured at low temperature (−123° C.). The single crystal was confirmed as a mesylate dihydrate structure with the following unit cell parameters: $\alpha=6.9255(5)$Å; $b=15.4500(12)$Å; $c=25.7918(19)$Å; $\alpha=\beta=\gamma=90°$;

$V=2759.7(4)$Å$^3$; $Z'=1$;

Space group $P2_12_12_1$;

Molecules/unit cell 4;

Density (calculated) 1.398 g/cm$^3$;

wherein Z' is the number of molecules per asymmetric unit.

Figure 17:
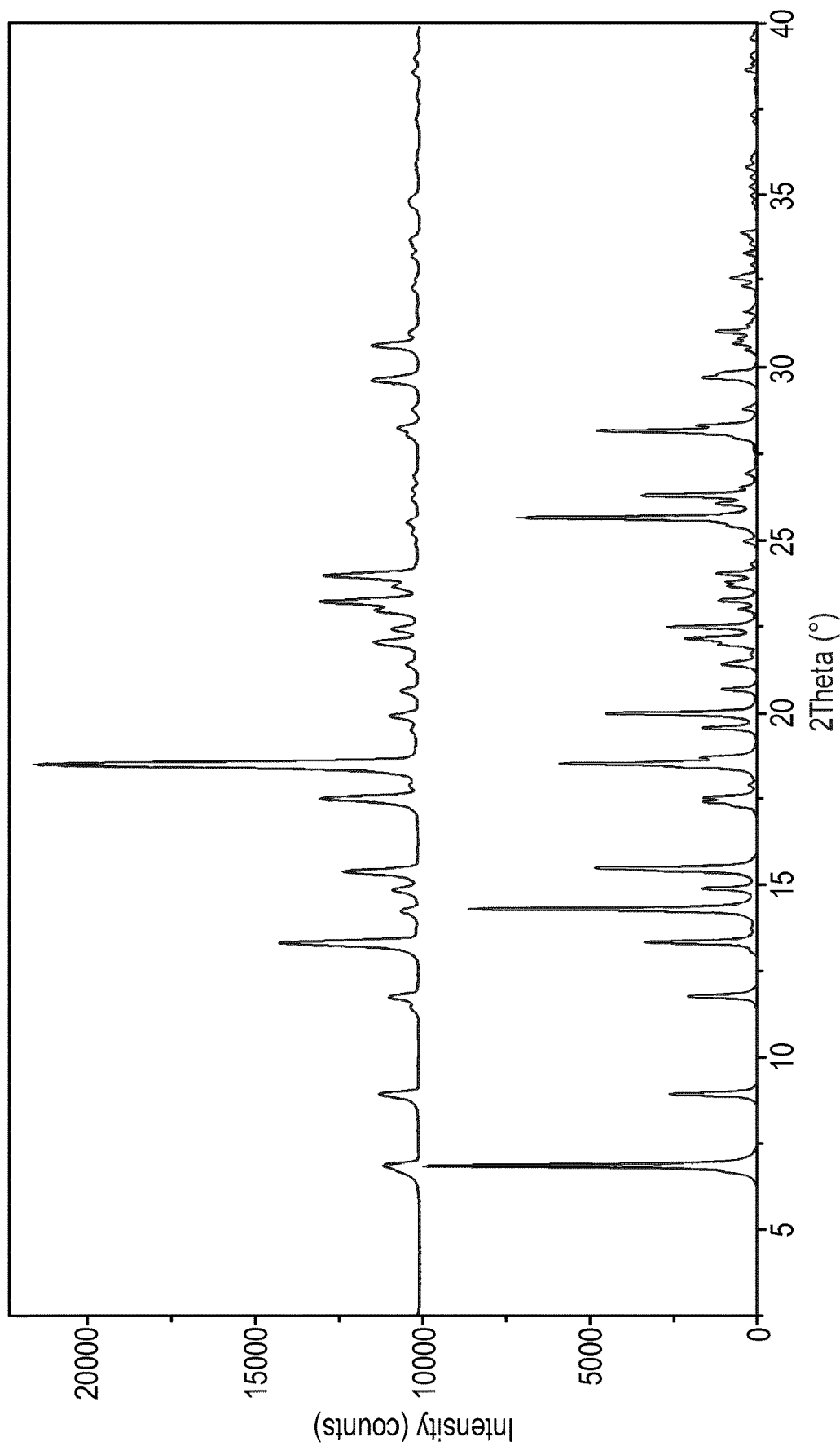
FIG. 17 compares the calculated vs experimental XRPD patterns for gepotidacin mesylate dihydrate (top, experimental; bottom, calculated).

FIG. 17 compares the calculated vs experimental XRPD patterns for gepotidacin mesylate dihydrate and it shows a good match in peak 2theta values.

Example 1h—Solubility

The solubility of gepotidacin mesylate dihydrate (Form 1) was determined in simulated gastric fluid pH 1.6 (SGF), fasted state simulated intestinal fluid pH 6.5 (FaSSIF) and fed state simulated intestinal fluid pH 6.5 (FeSSIF) at ambient room temperature (20-25 C). See Table 3 below.

TABLE 3

| Media | Solubility (mg/mL of free base at 20-25° C.) |
|---|---|
| Water | >180 |
| SGF (pH 1.6) | 175 |
| FaSSIF (pH 6.5) | 113 |
| FeSSIF (pH 6.5) | 99 |

Example 2

Gepotidacin Mesylate Anhydrate (Form 2)

Example 2a—Preparation

Gepotidacin mesylate dihydrate (Form 1) (894 mg) was suspended in isopropyl alcohol (IPA) (5.4 ml) and heated to 61° C. The resultant solids were analysed in-situ by Raman and as a damp slurry by XRPD.

In another preparation, a spatula (<20 mg) of gepotidacin mesylate dihydrate (Form) 1 was suspended in IPA (<1.5 ml). The suspension was heated with a heat gun to dissolve most of the solids, and then left to slowly cool to room temperature. The resultant crystals were filtered and analysed by DSC, TGA, and XRPD. Note that this form is unstable under ambient conditions and therefore the resultant analysis may not be for a phase pure anhydrate sample.

Example 2b—XRPD

The X-ray powder diffraction (XRPD) pattern of gepotidacin mesylate anhydrate (Form 2) whilst damp with solvent is shown in in FIG. 5 and a summary of the diffraction angle and d-spacings is given in table 4 below. The XRPD analysis was conducted on a PANalytical Empyrean diffractometer on Si zero-background wafers. The acquisition conditions included Cu K$_\alpha$ radiation, generator tension 45 kV, generator current: 40 mA, step size 0.03° 2θ.

TABLE 4

| Diff. Angle [°2θ] | d-spacing [Å] |
|---|---|
| 7.1 | 12.5 |
| 9.7 | 9.1 |
| 12.1 | 7.3 |
| 13.5 | 6.6 |
| 13.7 | 6.5 |
| 14.2 | 6.2 |
| 14.6 | 6.1 |
| 15.2 | 5.8 |
| 15.7 | 5.6 |
| 16.0 | 5.5 |
| 17.3 | 5.1 |
| 17.9 | 4.9 |
| 18.3 | 4.8 |
| 19.0 | 4.7 |
| 19.1 | 4.6 |
| 19.5 | 4.6 |
| 20.2 | 4.4 |
| 21.8 | 4.1 |
| 22.2 | 4.0 |
| 22.9 | 3.9 |
| 23.7 | 3.8 |
| 24.2 | 3.7 |
| 24.7 | 3.6 |
| 25.5 | 3.5 |
| 25.8 | 3.5 |
| 26.4 | 3.4 |
| 26.6 | 3.3 |
| 26.9 | 3.3 |
| 27.6 | 3.2 |
| 28.7 | 3.1 |
| 28.9 | 3.1 |
| 29.1 | 3.1 |
| 29.8 | 3.0 |
| 30.8 | 2.9 |
| 31.7 | 2.8 |
| 32.0 | 2.8 |
| 33.0 | 2.7 |
| 35.1 | 2.6 |
| 36.2 | 2.5 |
| 37.3 | 2.4 |
| 39.3 | 2.3 |

Figure 21:
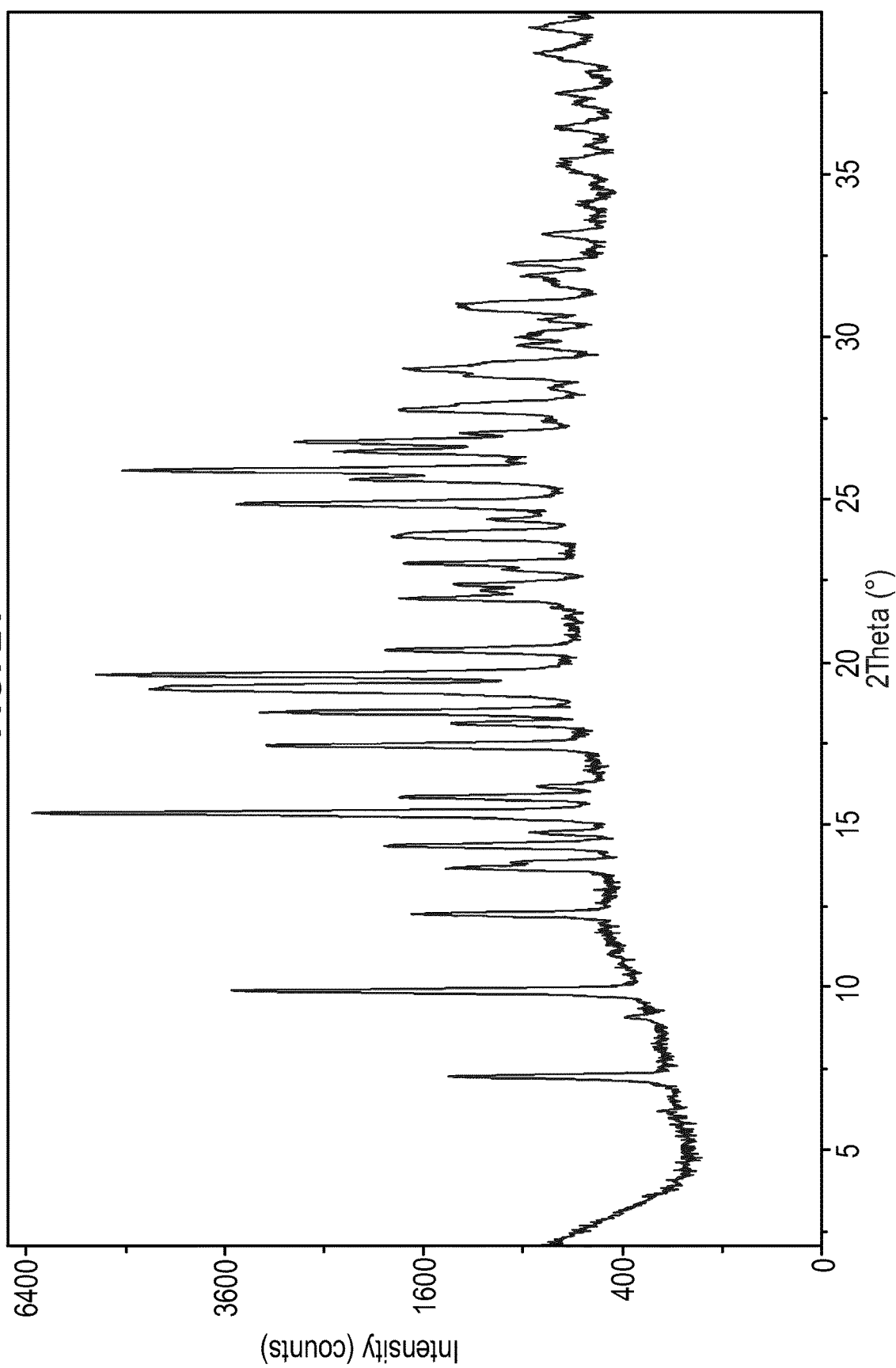
FIG. 21 shows an X-ray powder diffraction pattern of gepotidacin mesylate anhydrate (Form 2).

The XRPD patterns of another sample of gepotidacin mesylate anhydrate (Form 2) is shown in FIG. 21 (see Table 5). The XRPD analysis was conducted on a PANalytical X'Pert Pro diffractometer on Si zero-background wafers. The acquisition conditions included Cu K$_\alpha$ radiation, generator tension 45 kV, generator current: 40 mA, step size 0.02° 2θ.

TABLE 5

| Diff Angle (2θ°) | d-spacing [Å] |
|---|---|
| 7.2 | 12.2 |
| 9.1 | 9.8 |
| 9.9 | 9.0 |

TABLE 5-continued

| Diff Angle (2θ°) | d-spacing [Å] |
|---|---|
| 12.2 | 7.2 |
| 13.6 | 6.5 |
| 13.8 | 6.4 |
| 14.3 | 6.2 |
| 14.7 | 6.0 |
| 15.3 | 5.8 |
| 15.8 | 5.6 |
| 16.1 | 5.5 |
| 17.4 | 5.1 |
| 18.1 | 4.9 |
| 18.4 | 4.8 |
| 19.1 | 4.6 |
| 19.3 | 4.6 |
| 19.6 | 4.5 |
| 20.4 | 4.4 |
| 21.9 | 4.1 |
| 22.4 | 4.0 |
| 23.0 | 3.9 |
| 23.8 | 3.7 |
| 24.0 | 3.7 |
| 24.4 | 3.7 |
| 24.8 | 3.6 |
| 25.6 | 3.5 |
| 25.9 | 3.4 |
| 26.5 | 3.4 |
| 26.8 | 3.3 |
| 27.0 | 3.3 |
| 27.7 | 3.2 |
| 27.9 | 3.2 |
| 28.8 | 3.1 |
| 29.0 | 3.1 |
| 29.7 | 3.0 |
| 30.0 | 3.0 |
| 30.5 | 2.9 |
| 30.8 | 2.9 |
| 31.0 | 2.9 |
| 31.9 | 2.8 |
| 32.3 | 2.8 |
| 33.2 | 2.7 |
| 34.1 | 2.6 |
| 35.4 | 2.5 |
| 36.4 | 2.5 |
| 37.5 | 2.4 |
| 38.7 | 2.3 |
| 39.5 | 2.3 |

Example 2c—Raman Spectrum

Figure 6:
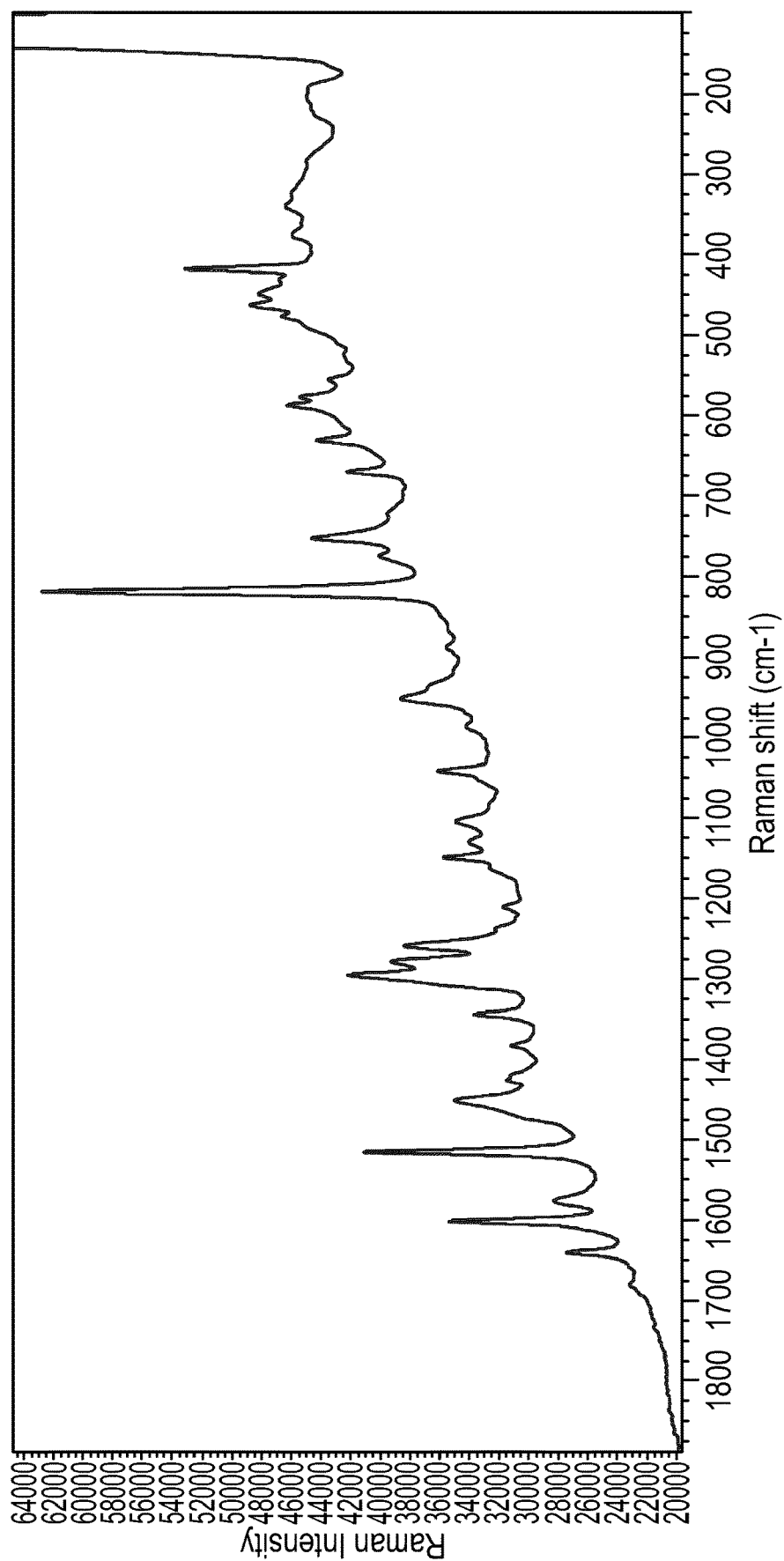
FIG. 6 shows a Raman spectrum of gepotidacin mesylate anhydrate (Form 2).

The Raman spectrum of gepotidacin mesylate anhydrate (Form 2) was collected in-situ in an IPA suspension using a Kaiser Raman RXN-4 fitted with IO ¼ inch S-NIR probe with a 15 sec exposure time and 1 accumulation. Excitation was from a λ=785 nm laser. The Raman spectrum of this material suspended in IPA is shown in FIG. 6 with major peaks observed at 418, 463, 587, 631, 670, 753, 819, 953, 1042, 1105, 1150, 1260, 1280, 1297, 1345, 1453, 1517, 1578, 1603, 1642 cm$^{-1}$.

Example 2d—DSC

The DSC of gepotidacin mesylate anhydrate (Form 2) was conducted with a TA Instruments Q200 differential scanning calorimeter equipped with an autosampler and a refrigerated cooling system under 50 mL/min N$_2$ purge. DSC thermograms of samples were obtained at 10° C./min in crimped Al pan. The DSC thermogram of Form 2 exhibits an endotherm with an onset temperature of about 201° C. (FIG. 7). A person skilled in the art would recognize that the onset temperature of the endotherm may vary depending on the experimental conditions.

Example 2e—TGA

The thermogravimetric analysis (TGA) thermogram of gepotidacin mesylate anhydrate (Form 2) was recorded on a TA Instruments Q5000 thermogravimetric analyzer under 25 mL/min N$_2$ flow and a heating rate of 10° C./min. The TGA thermogram of anhydrate exhibits a weight loss of about 2% from 25-200° C. (FIG. 8).

Gepotidacin mesylate anhydrate (Form 2) was shown to convert to Gepotidacin mesylate dihydrate (Form 1) after one hour at ambient conditions. DVS of gepotidacin mesylate anhydrate shows a critical RH step on the first sorption cycle at 60% RH with a 4.8% uptake of water, indicating conversion to Gepotidacin mesylate dihydrate (Form 1).

Example 2f—Single Crystal Structure

A single crystal of gepotidacin mesylate anhydrate was prepared by slow cooling from a 2-propanol solution.

Single crystal data were collected on a Bruker D8 Venture system using an Incoatec microfocus 3.0 CuKα Source. Data collection and unit cell Indexing were performed in the APEX3 v2017.3-0 suite (Bruker AXS Inc., 2017); processing of the measured intensity data was carried out with the SAINT V8.38A (Bruker AXS Inc., 2017) software package. The structures were solved by direct methods using the SHELXT-2018/2 (Sheldrick, 2018) software package. The derived atomic parameters (coordinates and temperature factors) were refined through full matrix least-squares in SHELXL-2018/3 (Sheldrick, 2018). Hydrogens were introduced in idealized positions, except for those on heteroatoms, which were freely refined.

Single crystal X-ray data were measured at low temperature (−123° C.). The single crystal was confirmed as a mesylate anhydrate structure with the following unit cell parameters: α=12.3921(7)Å; b=7.0262(4)Å; c=14.6536(9) Å; α=γ=90°; β=95.0077(13°); V=1271.01(13)Å$^3$; Z'=1;

Space group P2$_1$;
Drug molecules/unit cell 2;
Density (calculated) 1.423 g/cm$^3$;
wherein Z' is the number of drug molecules per asymmetric unit.

Figure 18:
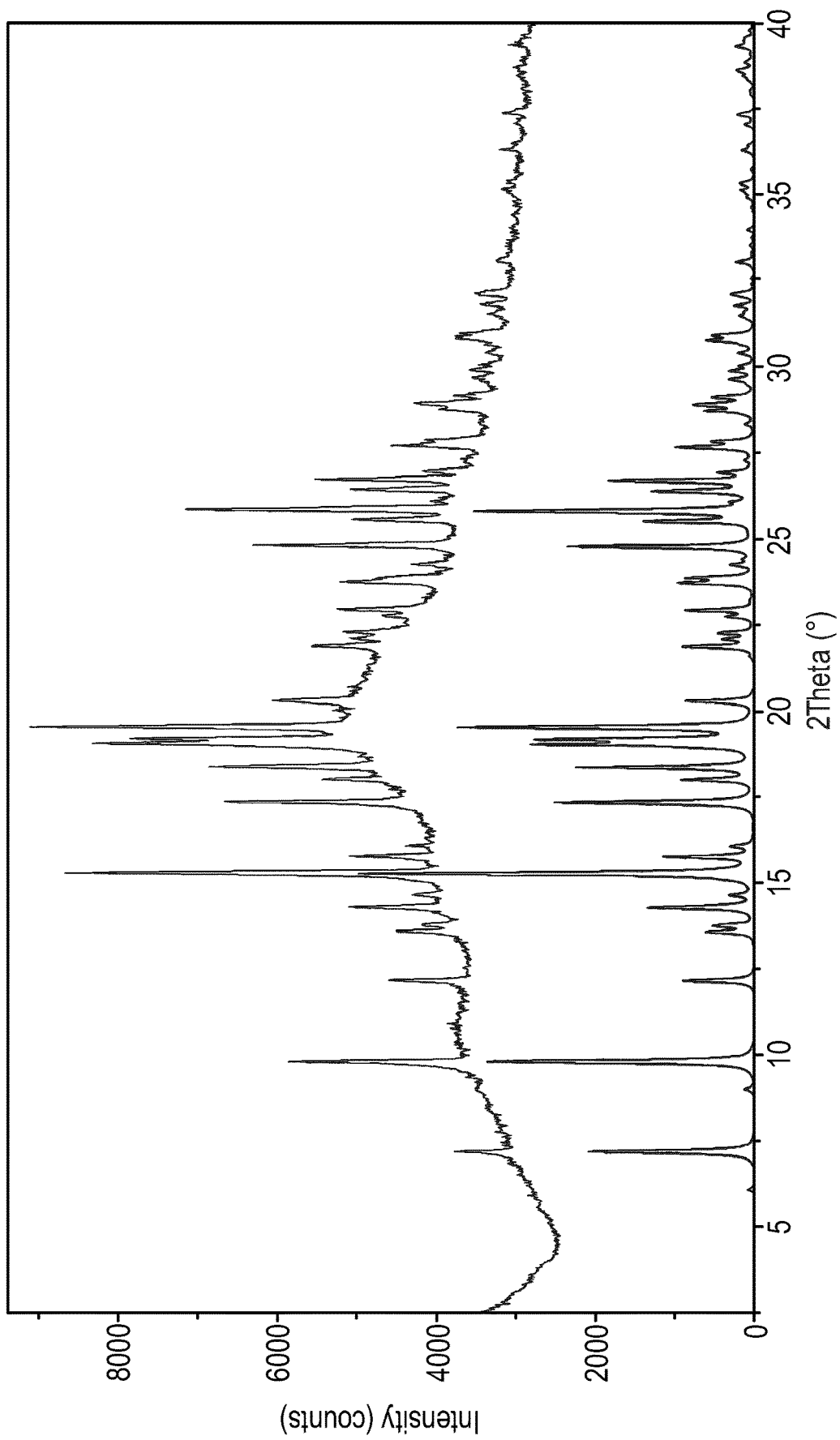
FIG. 18 compares the calculated vs experimental XRPD patterns for gepotidacin mesylate anhydrate (top, experimental; bottom, calculated).

FIG. 18 compares the calculated vs experimental XRPD patterns for gepotidacin mesylate anhydrate and it shows a good match in peak 2theta values.

Example 3

Gepotidacin Mesylate Monohydrate (Form 3)

Example 3a—Preparation

Gepotidacin mesylate dihydrate (Form 1) (900 mg) was suspended in IPA (5.4 ml) and heated to 61° C. Water (0.17 ml) was charged. The resultant solids were slurried overnight then analysed in-situ by Raman. The suspension was filtered and the crystalline solids were analysed by XRPD, DSC and TGA.

Example 3b—XPRD

The X-ray powder diffraction (XRPD) pattern of gepotidacin mesylate monohydrate is shown in in FIG. 9 and a summary of the diffraction angle and d-spacings is given in table 6 below. The XRPD analysis was conducted on a PANalytical Empyrean diffractometer on Si zero-background wafers. The acquisition conditions included Cu $K_\alpha$ radiation, generator tension 45 kV, generator current: 40 mA, step size 0.03 o 2θ.

TABLE 6

| Diff. Angle [°2θ] | d-spacing [Å] |
|---|---|
| 5.6 | 15.7 |
| 7.1 | 12.4 |
| 8.8 | 10.0 |
| 11.2 | 7.9 |
| 13.0 | 6.8 |
| 13.7 | 6.5 |
| 15.1 | 5.9 |
| 15.8 | 5.6 |
| 17.1 | 5.2 |
| 18.0 | 4.9 |
| 18.7 | 4.7 |
| 19.0 | 4.7 |
| 19.2 | 4.6 |
| 19.6 | 4.5 |
| 20.1 | 4.4 |
| 20.7 | 4.3 |
| 21.6 | 4.1 |
| 22.5 | 4.0 |
| 23.3 | 3.8 |
| 23.9 | 3.7 |
| 25.0 | 3.6 |
| 25.9 | 3.4 |
| 26.7 | 3.3 |
| 27.4 | 3.3 |
| 28.3 | 3.1 |
| 29.2 | 3.1 |
| 30.1 | 3.0 |
| 31.0 | 2.9 |
| 31.4 | 2.8 |
| 32.5 | 2.8 |
| 33.2 | 2.7 |
| 34.6 | 2.6 |
| 36.6 | 2.5 |

Figure 22:
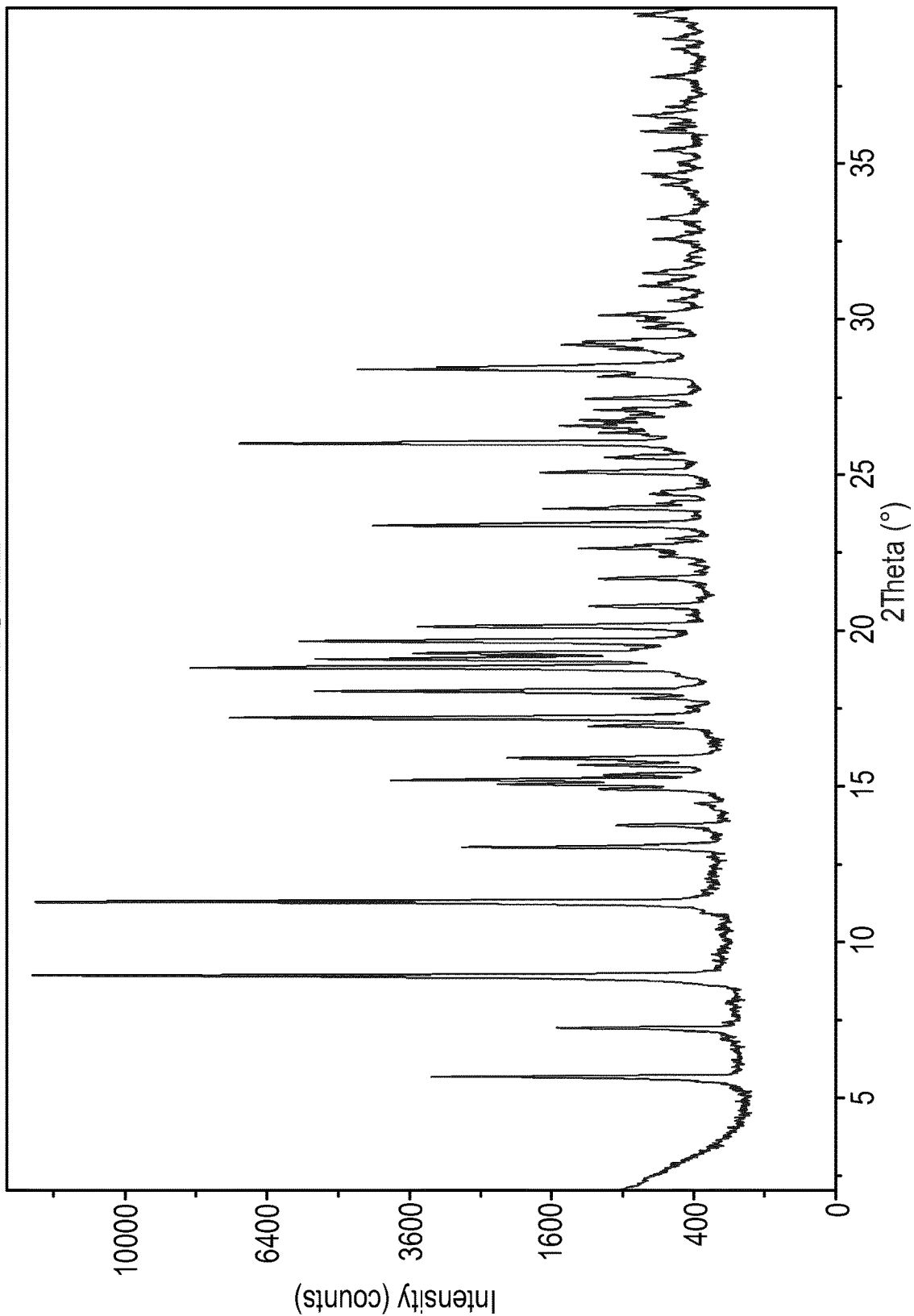
FIG. 22 shows an X-ray powder diffraction pattern of gepotidacin mesylate monohydrate (Form 3).

The XRPD patterns of another sample of gepotidacin mesylate monohydrate is shown in FIG. 22 (see Table 7). The XRPD analysis was conducted on a PANalytical X'Pert Pro diffractometer on Si zero-background wafers. The acquisition conditions included Cu $K_\alpha$ radiation, generator tension 45 kV, generator current: 40 mA, step size 0.02° 2θ.

TABLE 7

| Diff Angle (2θ°) | d-spacing [Å] |
|---|---|
| 5.7 | 15.6 |
| 7.2 | 12.3 |
| 8.9 | 9.9 |
| 11.3 | 7.8 |
| 13.0 | 6.8 |
| 13.7 | 6.4 |
| 14.4 | 6.1 |
| 14.9 | 6.0 |
| 15.0 | 5.9 |
| 15.2 | 5.8 |
| 15.4 | 5.8 |
| 15.7 | 5.7 |
| 15.9 | 5.6 |
| 16.9 | 5.2 |
| 17.2 | 5.2 |
| 17.8 | 5.0 |
| 18.0 | 4.9 |
| 18.8 | 4.7 |
| 19.1 | 4.7 |
| 19.3 | 4.6 |
| 19.6 | 4.5 |
| 20.1 | 4.4 |
| 20.8 | 4.3 |
| 21.6 | 4.1 |
| 22.3 | 4.0 |

TABLE 7-continued

| Diff Angle (2θ°) | d-spacing [Å] |
|---|---|
| 22.6 | 3.9 |
| 22.9 | 3.9 |
| 23.3 | 3.8 |
| 23.9 | 3.7 |
| 24.3 | 3.7 |
| 25.0 | 3.6 |
| 25.5 | 3.5 |
| 26.0 | 3.4 |
| 26.3 | 3.4 |
| 26.6 | 3.4 |
| 26.7 | 3.3 |
| 27.1 | 3.3 |
| 27.4 | 3.3 |
| 28.1 | 3.2 |
| 28.4 | 3.1 |
| 28.5 | 3.1 |
| 29.0 | 3.1 |
| 29.1 | 3.1 |
| 29.7 | 3.0 |
| 29.9 | 3.0 |
| 30.1 | 3.0 |
| 30.6 | 2.9 |
| 31.0 | 2.9 |
| 31.4 | 2.8 |
| 32.5 | 2.7 |
| 33.2 | 2.7 |
| 34.3 | 2.6 |
| 34.6 | 2.6 |
| 35.0 | 2.6 |
| 35.4 | 2.5 |
| 36.0 | 2.5 |
| 36.5 | 2.5 |
| 36.8 | 2.4 |
| 37.7 | 2.4 |
| 38.6 | 2.3 |
| 39.0 | 2.3 |
| 39.7 | 2.3 |

Example 3c—Raman Spectrum

Figure 10:
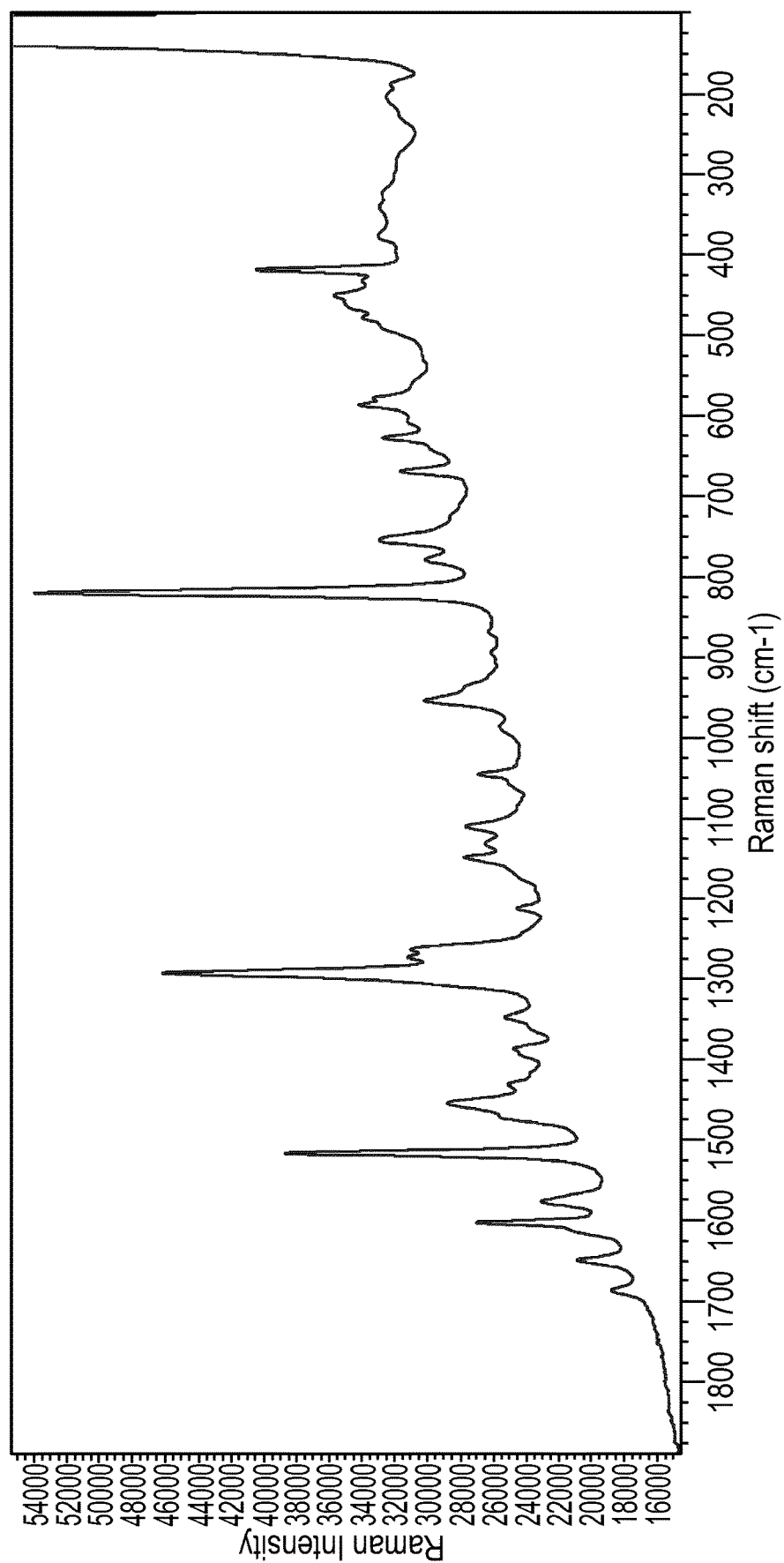
FIG. 10 shows a Raman spectrum of gepotidacin mesylate monohydrate (Form 3).

The Raman spectrum of gepotidacin mesylate monohydrate was recorded in-situ in an IPA/water suspension using a Kaiser Raman RXN-4 fitted with IO ¼ inch S-NIR probe with a 15 sec exposure time and 1 accumulation. Excitation was from a λ=785 nm laser. The Raman spectrum of this material suspended in IPA is shown in FIG. 10 with major peaks observed at 418, 449, 586, 627, 668, 753, 778, 819, 953, 1044, 1109, 1148, 1211, 1272, 1292, 1346, 1386, 1453, 1516, 1576, 1602, 1649 and 1686 $cm^{-1}$.

Example 3d—DSC

The DSC of gepotidacin mesylate monohydrate was conducted with a TA Instruments Q200 differential scanning calorimeter equipped with an autosampler and a refrigerated cooling system under 50 mL/min $N_2$ purge. DSC thermograms of samples were obtained at 10° C./min in crimped Al pan. The DSC thermogram of gepotidacin mesylate monohydrate exhibits a broad endotherm from about 50-130° C. followed by an endotherm with an onset temperature of about 202° C. (FIG. 11). A person skilled in the art would recognize that the onset temperature of the endotherms may vary depending on the experimental conditions.

Example 3e—TGA

The thermogravimetric analysis (TGA) thermogram of gepotidacin mesylate monohydrate was recorded on a TA Instruments Q5000 thermogravimetric analyzer under 25 mL/min N$_2$ flow and a heating rate of 10° C./min. The TGA thermogram of gepotidacin mesylate monohydrate exhibits a loss of about 3.1% (1.0 eq) from 55-80° C. (FIG. 12).

Example 4

Gepotidacin Anhydrate

Example 4a—Preparation Method 1

Gepotidacin (52 g) and 1-propanol (440 mL) was heated to 90° C. 40 mL 1-propanol was added to the clear solution and the combined contents were re-heated to 90° C. The clear solution was cooled to 76° C. and held stirring for 1 hour. The slurry was cooled to 0° C. and held stirring overnight. The slurry was filtered, washed with chilled 1-propanol and dried under vacuum for approximately 6 hours at 50° C. to give gepotidacin anhydrate as a crystalline solid (47.8 g).

Example 4b—Preparation Method 2

The preparation of gepotidacin anhydrate was carried out on scale according to the following processes:

Charge n-Propanol (12 vol.) to gepotidacin (1.0 equiv) and heat the mixture to 95±3° C. to attain complete dissolution. Filter the mass at 95±3° C. and wash the filters with n-Propanol (0.1 vol). Take filtrate and heat again to 95±3° C. and to ensure complete dissolution. Cool the mass to 77±2° C. Charge seed slurry (1.0% w/w suspended in 2.5 vol n-propanol) and stir for at least 1 h at 77±2° C. Further cool the slurry mass to 0±2° C. and stir for 1 h. Filter the material and wash the cake with n-Propanol (2 vol). Dry the material under vacuum at 50±2° C.

Example 4c—XRPD

The X-ray powder diffraction (XRPD) pattern of gepotidacin anhydrate is shown in in FIG. 13 and a summary of the diffraction angle and d-spacings is given in table 8 below. The XRPD analysis was conducted on a PANalytical X'Pert Pro diffractometer on Si zero-background wafers. The acquisition conditions included Cu K$_\alpha$ radiation, generator tension 45 kV, generator current: 40 mA, step size 0.02° 2θ.

TABLE 8

| Diff. Angle [°2θ] | d-spacing [Å] |
| --- | --- |
| 8.8 | 10.1 |
| 10.8 | 8.2 |
| 11.7 | 7.6 |
| 13.2 | 6.7 |
| 14.4 | 6.2 |
| 16.3 | 5.4 |
| 17.4 | 5.1 |
| 17.6 | 5.0 |
| 17.7 | 5.0 |
| 18.1 | 4.9 |
| 18.7 | 4.7 |
| 19.0 | 4.7 |
| 19.4 | 4.6 |
| 19.9 | 4.5 |
| 20.8 | 4.3 |
| 21.6 | 4.1 |
| 21.8 | 4.1 |
| 22.0 | 4.0 |
| 22.4 | 4.0 |
| 23.2 | 3.8 |
| 23.6 | 3.8 |
| 25.0 | 3.6 |
| 25.6 | 3.5 |
| 25.9 | 3.4 |
| 26.5 | 3.4 |
| 27.1 | 3.3 |
| 27.4 | 3.3 |
| 29.2 | 3.1 |
| 29.7 | 3.0 |
| 30.7 | 2.9 |
| 31.5 | 2.8 |
| 32.9 | 2.7 |
| 34.0 | 2.6 |
| 38.6 | 2.3 |

Figure 23:
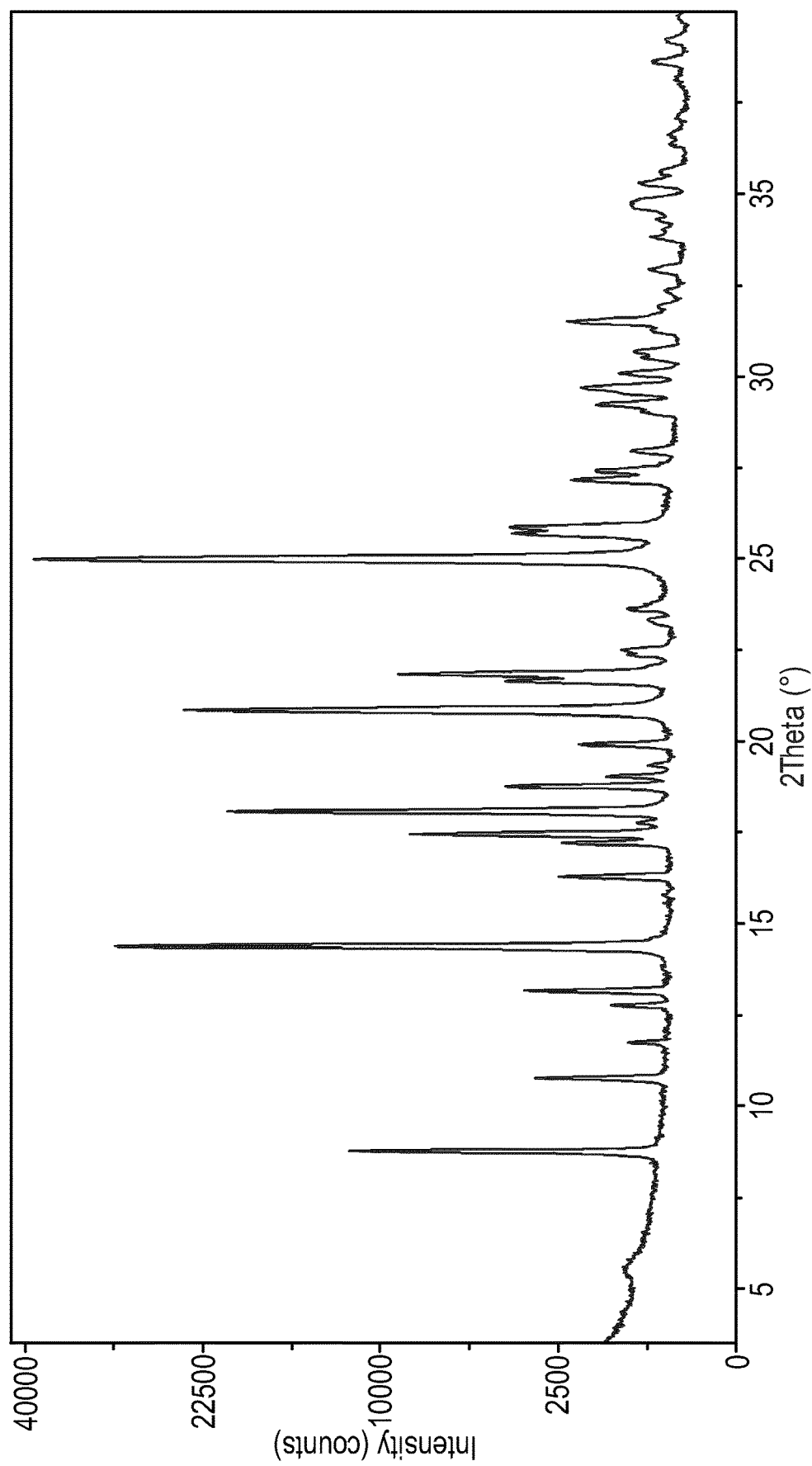
FIG. 23 shows an X-ray powder diffraction pattern of gepotidacin anhydrate.

The XRPD patterns of another sample of gepotidacin anhydrate is shown in FIG. 23. The XRPD analysis was conducted on a PANalytical X'Pert Pro diffractometer on Si zero-background wafers. The acquisition conditions included Cu K$_\alpha$ radiation, generator tension 45 kV, generator current: 40 mA, step size 0.02° 2θ.

TABLE 9

| Diff Angle (2θ°) | d-spacing [Å] |
| --- | --- |
| 5.5 | 16.1 |
| 8.8 | 10.1 |
| 10.8 | 8.2 |
| 11.7 | 7.5 |
| 12.8 | 6.9 |
| 13.2 | 6.7 |
| 14.4 | 6.2 |
| 15.8 | 5.6 |
| 16.3 | 5.5 |
| 17.2 | 5.2 |
| 17.4 | 5.1 |
| 17.7 | 5.0 |
| 18.1 | 4.9 |
| 18.7 | 4.7 |
| 19.0 | 4.7 |
| 19.3 | 4.6 |
| 19.9 | 4.5 |
| 20.8 | 4.3 |
| 21.6 | 4.1 |
| 21.8 | 4.1 |
| 22.3 | 4.0 |
| 22.5 | 4.0 |
| 23.3 | 3.8 |
| 23.6 | 3.8 |
| 25.0 | 3.6 |
| 25.7 | 3.5 |
| 25.9 | 3.4 |
| 27.1 | 3.3 |
| 27.4 | 3.3 |
| 27.9 | 3.2 |
| 29.2 | 3.1 |
| 29.5 | 3.0 |
| 29.7 | 3.0 |
| 30.1 | 3.0 |
| 30.5 | 2.9 |
| 30.6 | 2.9 |
| 31.5 | 2.8 |
| 31.9 | 2.8 |
| 32.4 | 2.8 |
| 32.9 | 2.7 |
| 33.8 | 2.7 |
| 34.3 | 2.6 |
| 34.6 | 2.6 |
| 34.8 | 2.6 |
| 35.3 | 2.5 |
| 35.6 | 2.5 |
| 36.3 | 2.5 |
| 36.6 | 2.5 |
| 37.1 | 2.4 |
| 38.1 | 2.4 |

TABLE 9-continued

| Diff Angle (2θ°) | d-spacing [Å] |
|---|---|
| 38.6 | 2.3 |
| 39.2 | 2.3 |

Example 4d—Raman Spectrum

Figure 14:
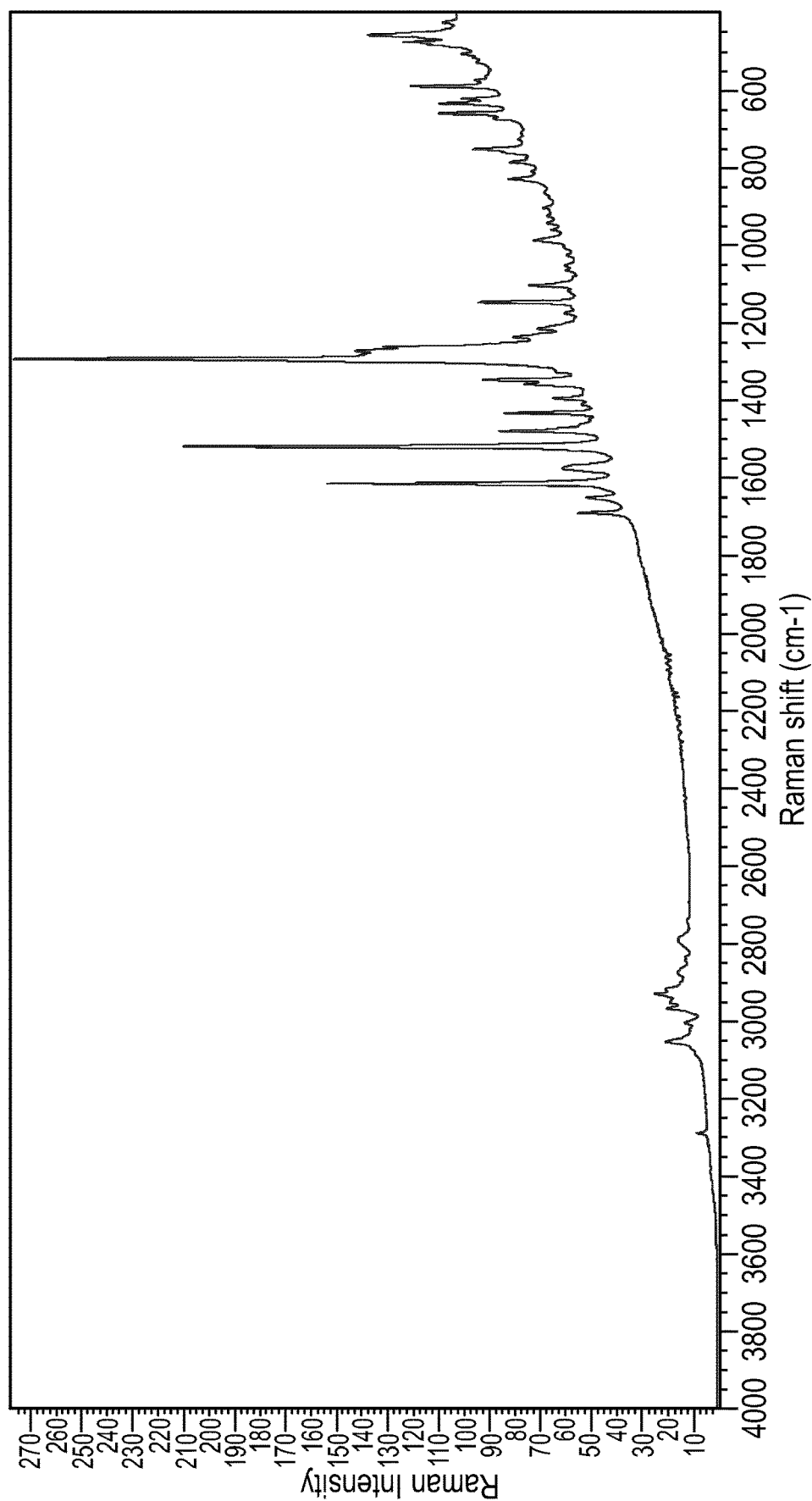
FIG. 14 shows a Raman spectrum of gepotidacin anhydrate.

The Raman spectrum of gepotidacin anhydrate was recorded on a Nicolet NXR9650 or Thermo Electron NXR 960 spectrometer, at 4 cm$^{-1}$ resolution with excitation from a Nd:YVO4 laser (λ=1064 nm). The Raman spectrum of this material is shown in FIG. 14 with major peaks observed at 453, 471, 586, 630, 656, 748, 825, 985, 1099, 1143, 1289, 1344, 1391, 1429, 1476, 1516, 1572, 1612, 1647, 1687, 2927 and 3051 cm$^{-1}$.

Example 4e—DSC

The DSC of gepotidacin anhydrate was conducted with a TA Instruments Q2000 differential scanning calorimeter equipped with an autosampler and a refrigerated cooling system under 40 mL/min N$_2$ purge. DSC thermograms of samples were obtained at 10° C./min in crimped A1 pan. The DSC thermogram of gepotidacin anhydrate exhibits a single endotherm with an onset temperature of about 196° C. (FIG. 15). A person skilled in the art would recognize that the onset temperature of the endotherm may vary depending on the experimental conditions.

Example 4f—TGA

The thermogravimetric analysis (TGA) thermogram of gepotidacin anhydrate was recorded on a TA Instruments Q50 thermogravimetric analyzer under 25 mL/min N$_2$ flow and a heating rate of 10° C./min. The TGA thermogram of Anhydrate exhibits a loss of about 0.25% from 25-200° C. (FIG. 16).

Example 4g—Single Crystal Structure

A single crystal of gepotidacin anhydrate was prepared by seeded slow cooling from a 1-propanol solution.

Single crystal data were collected on an Oxford Diffraction Xcalibur A Nova system using a Nova X-ray CuKα Source. Data collection and unit cell Indexing were performed in the CrysAlisPro 1.171.37.34i suite (Agilent Technologies, 2014); processing of the measured intensity data was also carried out with the CrysAlisPro 1.171.37.34i (Agilent Technologies, 2014) software package. The structures were solved by direct methods using the SHELXT-2018/2 (Sheldrick, 2018) software package. The derived atomic parameters (coordinates and temperature factors) were refined through full matrix least-squares in SHELXL-2018/3 (Sheldrick, 2018). Hydrogens were introduced in idealized positions, except for those on heteroatoms, which were freely refined.

Single crystal X-ray data were measured at low temperature (−123° C.). The single crystal was confirmed as a free base anhydrate structure with the following unit cell parameters: α=8.44022(16)Å; b=6.42442(12)Å; c=20.2774(5)Å; α=γ=90°; β=96.778(2°); V=1091.83(4)Å$^3$; Z'=1;

Space group P2$_1$;
Drug molecules/unit cell 2;
Density (calculated) 1.364 g/cm$^3$;

wherein Z' is the number of drug molecules per asymmetric unit.

Figure 19:
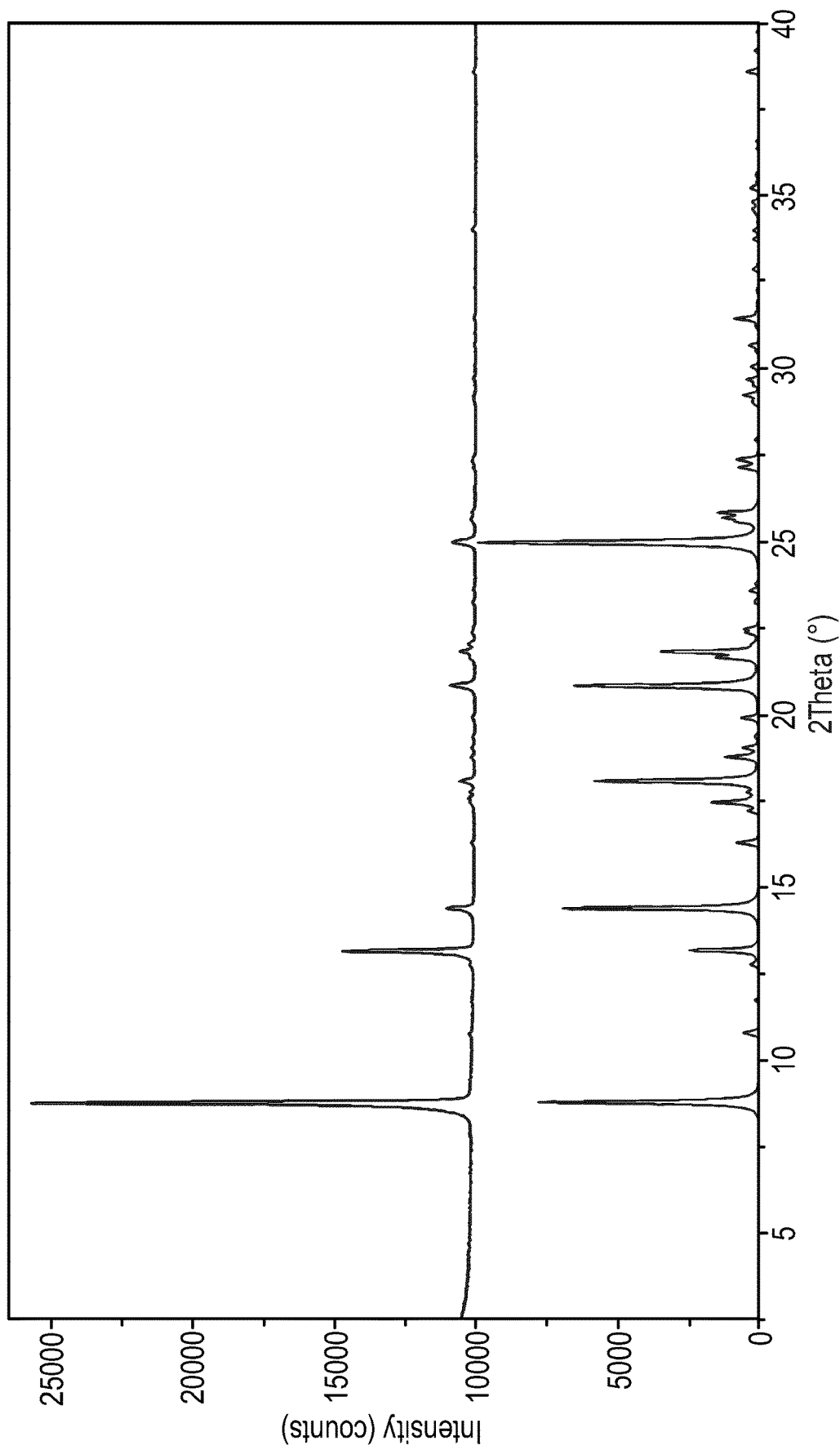
FIG. 19 compares the calculated vs experimental XRPD patterns for gepotidacin anhydrate (top, experimental; bottom, calculated).

FIG. 19 compares the calculated vs experimental XRPD patterns for gepotidacin anhydrate and it shows a good match in peak 2theta values.

Gepotidacin anhydrate exhibits low to moderate solubility (<20 mg/mL) in common solvents and water, except in dichloromethane and trifluoroethanol (>100 mg/mL).

The crystal-form screen of gepotidacin free base also yielded hydrates and other solvates. The relative thermodynamic stabilities of crystalline anhydrous gepotidacin and other forms were studied. At 40° C. gepotidacin anhydrate is more stable than the hydrates up to at least a$_w$=0.5. At 23° C. gepotidacin anhydrate is more stable at a$_w$ 0-0.8.

Example 5

Preparation of Gepotidacin Mesylate Mono-IPA Solvate Dihydrate

Gepotidacin mesylate mono-IPA solvate dihydrate can be prepared by dissolving Form 1 in 3% Aq v/v IPA with a heat gun, then placing the saturated solution directly into a cardice bath. Gepotidacin mesylate mono-IPA solvate dihydrate will gradually convert to Form 1 in the suspension and upon isolation. Gepotidacin mesylate mono-IPA solvate dihydrate can be formed in this way in 5% aqueous IPA but will convert to Form 1 within 3 hours at 20° C.

Example 6

Miscellaneous

Example 6a—Polymorphs and Water Activity

Figure 24A:
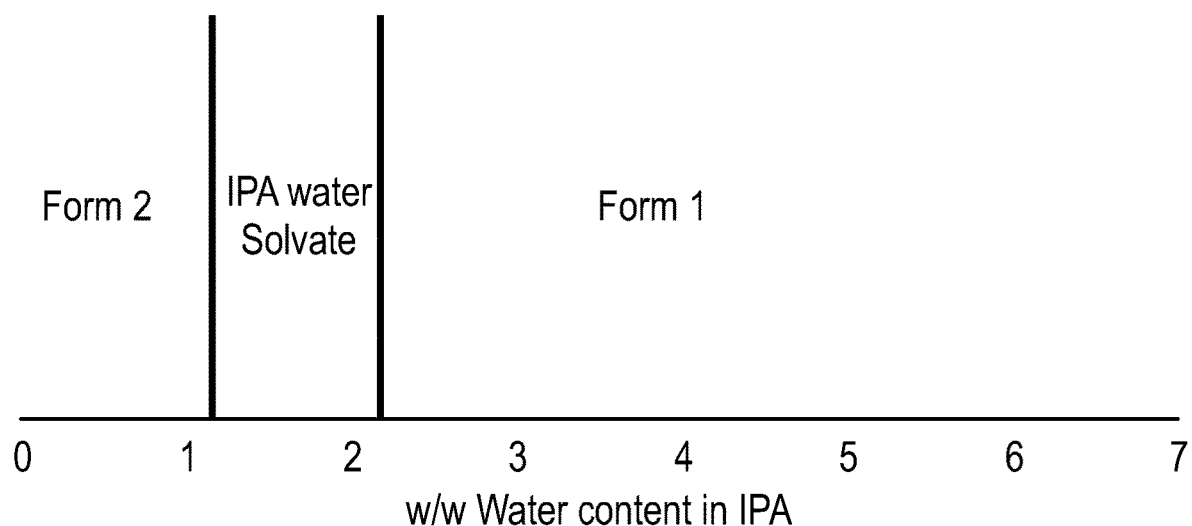
FIGS. 24A and 24B show water content boundaries for various forms of gepotidacin at 20-25° C. and 61° C., respectively.
Figure 24B:
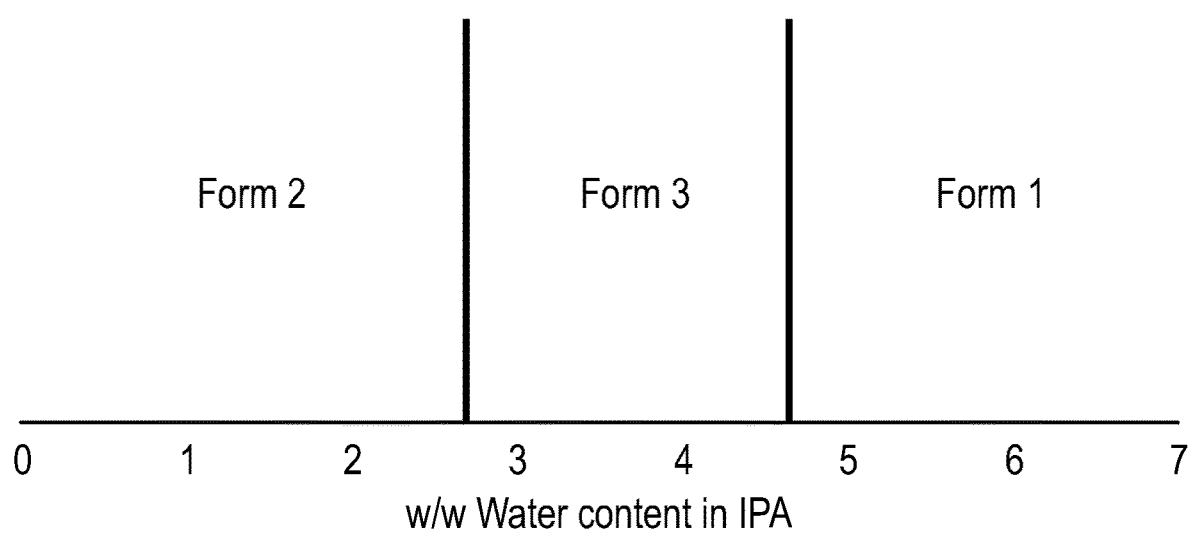

Form 1, Form 2, Form 3 and the mesylate IPA solvate dihydrate can be formed in water/IPA mixtures by changing the aqueous composition and/or order of solvent addition e.g. by adding water to compound in IPA or by adding as a mixture. The different forms were observed within the following water content boundaries which were estimated using solubility and KF data (w/w water content in IPA quoted) (see also FIGS. 24A and 24B):

At 20-25° C.: Form 2<1.147%>IPA/Water solvate <2.169%>Form 1;
At 61° C.: Form 2<2.694%>Form 3<4.643%>Form 1.

At room temperature, the solubility of Form 1 is lower than the other polymorphs across a wide range of aqueous contents, suggesting it is the more stable form.

At 61° C., Form 3 was observed to convert to Form 1 at 5.2% w/w aqueous content but not at 4.2% w/w aqueous content (unseeded). The estimated phase boundary is 4.6% w/w aqueous content, based on the linear trendlines generated from water content vs concentration data (log scale).

The crystallisation process for making Form 1 is in 5% v/v aqueous IPA, which is equivalent of 6.25% w/w water. Therefore, the process is carried out in a composition favoring thermodynamic stability for Form 1.

Example 6b—Amorphous Solid

Amorphous gepotidacin mesylate can be generated via lyophilization. Form 1 (150 mg) was dissolved MeCN/water (80/20 v/v; 1 mL). A clarifying filtration was performed and the filtrate was added to a 20 mL vial. The solution was frozen under liquid nitrogen and lyophilized for 4 hours. The material was determined to be amorphous by PXRD, but started to convert to Form 1 unless stored in a sealed vial with desiccant.

Amorphous material was also prepared by lyophilization of an aq. t-BuOH solution, exhibited a glass transition temperature of 63.9° C. and was physically stable for at least three days at ambient conditions.

Example 6c—Comparison of Mesylate and HCl Salts

Gepotidacin HCl salt was prepared as set out in Example 39 of WO 2008/128942. Gepotidacin mesylate dihydrate demonstrates handling advantages relative to gepotidacin HCl. The moisture sorption/desorption isotherms of gepotidacin mesylate dihydrate and gepotidacin HCl were obtained over a range of 5-90% relative humidity. The gepotidacin mesylate dihydrate sample picked up less than 2% water while the gepotidacin HCl sample picked up approximately 10% water.

It is to be understood that the invention is not limited to the aspects or embodiments illustrated hereinabove and the right is reserved to the illustrated aspects or embodiments and all modifications coming within the scope of the following claims.

The various references to journals, patents, and other publications which are cited herein comprise the state of the art and are incorporated herein by reference as though fully set forth.

The invention claimed is:

1. A crystalline form of gepotidacin, which is selected from the group consisting of gepotidacin mesylate anhydrate, gepotidacin mesylate monohydrate, gepotidacin mesylate dihydrate and gepotidacin anhydrate.

2. The crystalline form according to claim 1, wherein the crystalline form is gepotidacin mesylate dihydrate.

3. The crystalline form according to claim 1, wherein the crystalline form is gepotidacin mesylate dihydrate characterized by an X-ray powder diffraction (XRPD) pattern comprising at least three or at least four diffraction angles, when measured using Cu $K_\alpha$ radiation, selected from the group consisting of about 9.0, 11.5, 13.4, 14.3, 14.9, 15.5, 17.6, 18.6, and 20.7 degrees 2θ.

4. The crystalline form according to claim 1, wherein the crystalline form is gepotidacin mesylate dihydrate characterized by an X-ray powder diffraction (XRPD) pattern substantially in accordance with FIG. 1.

5. The crystalline form according to claim 1, wherein the crystalline form is gepotidacin mesylate dihydrate characterized by the following unit cell parameters:
a=6.9255(5)Å;  b=15.4500(12)Å;  c=25.7918(19)Å;
α=β=γ=90°;
V=2759.7(4)Å$^3$; Z'=1;
Space group P2$_1$2$_1$2$_1$;
Molecules/unit cell 4;
Density (calculated) 1.398 g/cm$^3$;
wherein Z' is the number of molecules per asymmetric unit.

6. The crystalline form according to claim 1, wherein the crystalline form is gepotidacin mesylate anhydrate.

7. The crystalline form according to claim 1, wherein the crystalline form is gepotidacin mesylate anhydrate characterized by an X-ray powder diffraction (XRPD) pattern comprising at least three or at least four diffraction angles, when measured using Cu $K_\alpha$ radiation, selected from the group consisting of about 7.1, 9.7, 12.1, 14.2, 15.2, 17.3, and 20.2 degrees 2θ.

8. The crystalline form according to claim 1, wherein the crystalline form is gepotidacin mesylate anhydrate characterized by an X-ray powder diffraction (XRPD) pattern substantially in accordance with FIG. 5.

9. The crystalline form according to claim 1, wherein the crystalline form is gepotidacin mesylate anhydrate characterized by the following unit cell parameters:
a=12.3921(7)Å;  b=7.0262(4)Å;  c=14.6536(9)Å;
α=γ=90°;
β=95.0077(13)°; V=1271.01(13)Å3; Z'=1
Space group P2$_1$;
Molecules/unit cell 2;
Density (calculated) 1.423 g/cm$^3$;
wherein Z' is the number of molecules per asymmetric unit.

10. The crystalline form according to claim 1, wherein the crystalline form is gepotidacin mesylate monohydrate.

11. The crystalline form according to claim 1, wherein the crystalline form is gepotidacin mesylate monohydrate characterized by an X-ray powder diffraction (XRPD) pattern comprising at least three or at least four diffraction angles, when measured using Cu Kα radiation, selected from the group consisting of about 5.6, 7.1, 8.8, 11.2, 13.0, 13.7, 20.1, 21.6, and 23.3 degrees 2θ.

12. The crystalline form according to claim 1, wherein the crystalline form is gepotidacin mesylate monohydrate characterized by an X-ray powder diffraction (XRPD) pattern substantially in accordance with FIG. 9.

13. The crystalline form according to claim 1, wherein the crystalline form is gepotidacin anhydrate characterized by an X-ray powder diffraction (XRPD) pattern comprising at least three or at least four diffraction angles, when measured using Cu $K_\alpha$ radiation, selected from the group consisting of about 8.8, 10.8, 11.7, 12.8, 13.2, 14.4, 16.3, 19.9, 20.8, and 25.0 degrees 2θ.

14. The crystalline form according to claim 1, wherein the crystalline form is gepotidacin anhydrate.

15. The crystalline form according to claim 1, wherein the crystalline form is gepotidacin anhydrate characterized by an X-ray powder diffraction (XRPD) pattern substantially in accordance with FIG. 13.

16. The crystalline form according to claim 1, wherein the crystalline form is gepotidacin anhydrate characterized by the following unit cell parameters:
a=8.44022(16)Å;  b=6.42442(12)Å;  c=20.2774(5)Å;
α=γ=90°;
β=96.778(2)°; V=1091.83(4)Å$^3$; Z'=1
Space group P2$_1$;
Molecules/unit cell 2;
Density (calculated) 1.364 g/cm$^3$;
wherein Z' is the number of molecules per asymmetric unit.

17. A pharmaceutical composition comprising the crystalline form according to claim 1 and a pharmaceutically acceptable carrier.

18. The pharmaceutical composition according to claim 17, wherein the pharmaceutical composition is for oral administration.

19. The pharmaceutical composition according to claim 18, wherein the pharmaceutical composition is a tablet or capsule.

20. A method of preparing a pharmaceutical composition comprising gepotidacin, which method comprises mixing the crystalline form according to claim 1 and a pharmaceutically acceptable carrier.

21. A method of treating a bacterial infection in a human in need thereof comprising administering to said human an effective amount of the crystalline form according to claim 1.

22. The method according to claim 21, wherein the bacterial infection is uncomplicated urinary tract infection or infection by *Neisseria gonorrhoeae*.

23. A method for preparing gepotidacin mesylate dihydrate comprising crystallizing gepotidacin mesylate in a solvent mixture of water and an organic solvent.

24. The method according to claim 23, wherein the organic solvent is 2-propanol.

* * * * *